(12) United States Patent
Austin et al.

(10) Patent No.: US 7,378,021 B2
(45) Date of Patent: May 27, 2008

(54) TIDAL VERTICAL FLOW WASTEWATER TREATMENT SYSTEM AND METHOD

(75) Inventors: David C. Austin, St. Paul, MN (US); Eric Lohan, Taos, NM (US)

(73) Assignee: Worrell Water Technologies, LLC, Charlottesville, PA (US)

( * ) Notice: Subject to any disclaimer, the term of this patent is extended or adjusted under 35 U.S.C. 154(b) by 0 days.

(21) Appl. No.: 11/740,983

(22) Filed: Apr. 27, 2007

(65) Prior Publication Data

US 2007/0199893 A1    Aug. 30, 2007

Related U.S. Application Data

(63) Continuation of application No. 11/062,907, filed on Feb. 22, 2005, now Pat. No. 7,214,317.

(51) Int. Cl.
*C02F 3/32* (2006.01)
*C02F 3/02* (2006.01)

(52) U.S. Cl. .................. 210/602; 210/617; 210/622; 210/150; 210/170.1; 210/747; 210/903

(58) Field of Classification Search ................ 210/602, 210/605, 614–617, 620–622, 630, 747, 170.01, 210/170.1, 170.07, 170.09, 195.1, 252, 259, 210/903, 908
See application file for complete search history.

(56) References Cited

U.S. PATENT DOCUMENTS 681,884 A     9/1901    Monjeau

| 2,306,027 | A | 12/1942 | Swaney |
| 2,486,512 | A | 11/1949 | Armstrong |
| 2,822,329 | A | 2/1958 | Griffith |
| 3,385,786 | A | 5/1968 | Klock |
| 3,563,888 | A | 2/1971 | Klock |
| 3,598,726 | A | 8/1971 | Welch |
| 3,768,200 | A | 10/1973 | Klock |
| 3,770,623 | A | 11/1973 | Seidel |

(Continued)

FOREIGN PATENT DOCUMENTS

DE    1916044    11/1969

(Continued)

OTHER PUBLICATIONS

Solar Aqua Systems, Inc. Marketing brochure, 1978.

(Continued)

*Primary Examiner*—Fred G. Prince
(74) *Attorney, Agent, or Firm*—Allen, Dyer, Doppelt, Milbrath & Gilchrist, P.A.

(57) ABSTRACT

A wastewater treatment system includes a tidal, sequential vertical flow marsh cell system having at least three marsh cells in serial forward fluid communication. Incoming wastewater to be treated is channeled to at least the first and a second marsh cell, and a portion of water exiting a final marsh cell, to the first marsh cell surface. Each marsh cell is alternately flooded and drained for enhancing aeration of incoming water and marsh cell contents, which include media and plant roots having biofilms growing thereon, the biofilms including a population of nitrifying and denitrifying bacteria, for achieving substantially simultaneous nitrification and denitrification of the wastewater.

15 Claims, 11 Drawing Sheets

U.S. PATENT DOCUMENTS

| | | | |
|---|---|---|---|
| 3,925,206 A | 12/1975 | Dea | |
| 4,008,159 A | 2/1977 | Besik | |
| 4,039,451 A | 8/1977 | Smith | |
| 4,057,933 A | 11/1977 | Enyeart | |
| 4,133,141 A * | 1/1979 | Lee | 47/79 |
| 4,169,050 A | 9/1979 | Serfling et al. | |
| 4,183,809 A | 1/1980 | Klapwijk et al. | |
| 4,267,038 A | 5/1981 | Thompson | |
| 4,277,342 A | 7/1981 | Hayes et al. | |
| 4,284,508 A | 8/1981 | Jewell | |
| 4,331,538 A | 5/1982 | Kickuth | |
| 4,333,837 A | 6/1982 | Plósz et al. | |
| 4,384,956 A | 5/1983 | Mulder | |
| 4,415,450 A | 11/1983 | Wolverton | |
| 4,443,337 A | 4/1984 | Otani et al. | |
| 4,482,458 A | 11/1984 | Rovel et al. | |
| 4,620,931 A | 11/1986 | Hirata et al. | |
| 4,678,582 A | 7/1987 | Lavigne | |
| 4,735,723 A | 4/1988 | Mulder | |
| 4,746,435 A | 5/1988 | Onishi et al. | |
| 4,793,929 A | 12/1988 | Kickuth et al. | |
| 4,839,051 A | 6/1989 | Higa | |
| 4,872,985 A | 10/1989 | Dinges | |
| 4,895,645 A | 1/1990 | Zorich, Jr. | |
| 4,904,386 A | 2/1990 | Kickuth | |
| 4,921,604 A | 5/1990 | Moellenbeck | |
| 4,959,084 A | 9/1990 | Wolverton et al. | |
| 4,997,568 A | 3/1991 | Vandervelde et al. | |
| 5,078,882 A | 1/1992 | Northrop | |
| 5,078,884 A | 1/1992 | Mulder | |
| 5,087,353 A | 2/1992 | Todd et al. | |
| 5,126,050 A | 6/1992 | Irvine et al. | |
| 5,137,625 A | 8/1992 | Wolverton | |
| 5,174,897 A | 12/1992 | Wengrzynek | |
| 5,259,959 A | 11/1993 | Mulder | |
| 5,320,663 A | 6/1994 | Cunningham | |
| 5,337,516 A | 8/1994 | Hondulas | |
| 5,389,257 A | 2/1995 | Todd et al. | |
| 5,393,426 A | 2/1995 | Raskin et al. | |
| 5,486,291 A | 1/1996 | Todd et al. | |
| 5,487,829 A | 1/1996 | Safferman et al. | |
| 5,518,618 A | 5/1996 | Mulder et al. | |
| 5,565,098 A | 10/1996 | Vellinga | |
| 5,618,413 A | 4/1997 | Todd et al. | |
| 5,626,644 A | 5/1997 | Northrop | |
| 5,733,453 A | 3/1998 | DeBusk | |
| 5,755,852 A | 5/1998 | Northrop | |
| 5,766,474 A | 6/1998 | Smith et al. | |
| 5,785,864 A | 7/1998 | Teran et al. | |
| 5,788,842 A | 8/1998 | Frisch | |
| 5,820,759 A | 10/1998 | Stewart et al. | |
| 5,863,433 A | 1/1999 | Behrends | |
| 5,863,435 A | 1/1999 | Heijnen et al. | |
| 5,876,484 A | 3/1999 | Raskin et al. | |
| 5,893,975 A | 4/1999 | Eifert | |
| 5,897,777 A | 4/1999 | Zoeller et al. | |
| 5,904,850 A | 5/1999 | Vellinga | |
| 5,906,745 A | 5/1999 | Eto | |
| 5,948,262 A | 9/1999 | Todd et al. | |
| 5,951,866 A | 9/1999 | Grove et al. | |
| 5,985,149 A | 11/1999 | Raetz et al. | |
| 6,045,695 A | 4/2000 | Janssen et al. | |
| 6,063,273 A | 5/2000 | Habets et al. | |
| 6,086,755 A | 7/2000 | Tepper | |
| 6,090,294 A | 7/2000 | Teran et al. | |
| 6,126,827 A | 10/2000 | Johnson, Jr. et al. | |
| 6,159,371 A | 12/2000 | Dufay | |
| 6,171,480 B1 | 1/2001 | Lee et al. | |
| 6,183,642 B1 | 2/2001 | Heijnen et al. | |
| 6,200,469 B1 | 3/2001 | Wallace | |
| 6,217,766 B1 | 4/2001 | Stetter et al. | |
| 6,221,652 B1 | 4/2001 | Janssen et al. | |
| 6,277,274 B1 | 8/2001 | Coffman | |
| 6,383,390 B1 | 5/2002 | Van Loosdrecht et al. | |
| 6,406,627 B1 | 6/2002 | Wallace | |
| 6,447,681 B1 | 9/2002 | Carlberg et al. | |
| 6,447,682 B1 | 9/2002 | Flowers | |
| 6,569,321 B2 * | 5/2003 | Coffman | 210/150 |
| 6,585,886 B1 | 7/2003 | Luehr | |
| 6,645,374 B2 | 11/2003 | Cote et al. | |
| 6,692,642 B2 | 2/2004 | Josse et al. | |
| 2002/0148779 A1 | 10/2002 | Shieh et al. | |
| 2002/0185437 A1 | 12/2002 | Haridas et al. | |
| 2004/0000517 A1 | 1/2004 | Austin et al. | |

FOREIGN PATENT DOCUMENTS

| | | |
|---|---|---|
| DE | 3941211 | 6/1991 |
| DE | 300 015 A7 | 5/1992 |
| GB | 1 579 623 | 11/1980 |
| GB | 2 182 651 | 5/1987 |
| JP | 58-70891 | 4/1983 |
| JP | 8-214721 | 8/1996 |
| JP | 10-15586 | 1/1998 |
| JP | P2000-246283 | 9/2000 |
| RU | 2107041 | 3/1998 |
| SU | 1346588 | 10/1987 |
| WO | WO 95/17351 | 6/1995 |
| WO | 02/076893 | 10/2002 |

OTHER PUBLICATIONS

Reed, Sherwood and Bastian, Robert, "Aquaculture Systems for Wastewater Treatment: An Engineering Assessment," U.S. Environmental Protection Agency Office of Water Program Operations Municipal Construction Division, 132 pages, Jun. 1980.

Jewell, W. J. et al., "Wastewater Treatment with Plants in Nutrient Films," U.S. Environmental Protection Agency, EPA-600/S2-83-067, pp. 1-5, Oct. 1983.

Jewell, William J., "Anaerobic Sewage Treatment," Environmental Science & Technology, vol. 21, pp. 14-21, Jan. 1987.

Zhu, T. et al., "Phosphorus Sorption and Chemical Characteristics of Lightweight Aggregates (LWA) Potential Filter Media in Treatment Wetlands," Wat. Sci. Tech., vol. 35, No. 5, pp. 103-108, 1997.

Austin, David, "Final Report on The South Burlington, Vermont Advanced Ecologically Engineered System (AEES) for Wastewater Treatment," U.S. Environmental Protection Agency, pp. i-M2, Mar. 4, 2000.

Alleman, James E., "The History of Fixed-Film Wastewater Treatment Systems," pp. 18, retrieved on Jul. 14, 2004. Retrieved from the Internet: <URL:http://bridge.ecn.purdue.edu/~alleman/w3-class/456/article/article-biofilmhistory.html>.

Lazarova, Valentina and Manem, Jacques, "Innovative Biofilm Treatment Technologies for Water and Wastewater Treatment," *Biofilms II: Process Analysis and Applications*, pp. 159-206, 2000.

Sun et al., "Treatment of Agricultural Wastewater in a Combined Tidal Flow-Downflow Reed Bed System," Water Science Technology, vol. 40, No. 3, pp. 139-146, 1999.

Rakocy, James E., "Integrating Tilapia Culture with Vegetable Hydroponics in Recirculating Systems," Tilapia Aquaculture in the Americas, vol. 1, pp. 163-184, World Aquaculture Society, Baton Rouge, Louisiana, 1997.

McBride, Graham B. and Tanner, Chris C., "Modelling Biofilm Nitrogen Transformations in Constructed Wetland Mesocosms with Fluctuating Water Levels," Ecological Engineering 14, pp. 93-106, Elsevier Science B.V., 2000.

Nguyen, Long M., "Organic Matter Composition, Microbial Biomass and Microbial Activity in Gravel-Bed Constructed Wetlands Treating Farm Dairy Wastewaters," Ecological Engineering 16, pp. 199-221, Elsevier Science B.V., 2000.

Tanner, Chris C. et al., "Effect of Water Level Fluctuation on Nitrogen Removal from Constructed Wetland Mesocosms," Ecological Engineering 12, pp. 67-92, Elsevier Science B.V., 1999.

Von Felde, Katrin and Kunst, Sabine, "N- and Cod-Removal in Vertical-Flow Systems," Water Science Technology, vol. 35, No. 5, pp. 79-85, Permagon Press, Oxford, 1997.

Green, Michal et al., "Investigation of Alternative Method for Nitrification in Constructed Wetlands," Water Science Technology, vol. 35, No. 5, pp. 63-70, Permagon Press, Oxford, 1997.

Laber, Johannes et al., "Two Strategies for Advanced Nitrogen Elimination in Vertical Flow Constructed Wetlands," Water Science Technology, vol. 35, No. 5, pp. 71-77, Permagon Press, Oxford, 1997.

Watson, J.T. and Danzig, A.J., "Pilot-Scale Nitrification Studies Using Vertical-Flow and Shallow Horizontal-Flow Constructed Wetland Cells," Constructed Wetlands for Water Quality Improvement, pp. 301-313, CRC Press, Inc., 1993.

Swoboda-Colberg, Norbert et al., "Constructed Vertical Flow Aerated Wetlands," U.S. Department of Commerce Final Report, pp. 1-54, Dec. 1994.

* cited by examiner

TIDAL VERTICAL FLOW WASTEWATER TREATMENT SYSTEM AND METHOD

CROSS-REFERENCE TO RELATED APPLICATIONS

This application is a continuation of application Ser. No.11/062,907, filed Feb. 22, 2005 now U.S. Pat No. 7,214,317, which itself is a continuation of application Ser. No. 10/463,199, filed Jun. 17, 2003, now U.S. Pat. No. 6,863,816, which itself is a continuation-in-part of application Ser. No. 10/377,287, filed Feb. 28, 2003, now U.S. Pat. No. 6,881,338, which claims priority to Provisional Application No. 60/389,398, filed Jun. 17, 2002. The disclosures of these applications are incorporated by reference hereinto.

BACKGROUND OF THE INVENTION

1. Field of the Invention

The present invention relates generally to wastewater treatment systems and methods, and, more particularly, to such systems and methods using bioremediation techniques.

2. Related Art

Engineered wetlands for wastewater treatment are known to have three basic hydraulic configurations: surface flow (SF), subsurface horizontal flow (SSHF), and vertical flow (VF), the first two believed the most common, and are known to have significant design shortcomings. Even though an early wastewater treatment wetland design utilized vertical flow, design criteria are still considered experimental for vertical flow wetlands. Surface-loaded, vertical-flow wetlands are believed advantageous because surface loading forces flow through the root zone.

The basic hydraulic flow path for VF wetlands is for wastewater to be introduced at the wetland surface, pass through media and plant roots, then to flow out of the wetland via an underdrain system. Vertical flow wetlands are often designed to have a period of filling followed by a period of draining. When filled by wastewater, bacterial metabolism within the media depletes dissolved oxygen, producing anoxic or anaerobic conditions. As water drains, air is drawn down into wetland media, which is important to permit aeration of wetland media. Drain and fill cycles with a period of approximately a day or less are termed tidal flow. Previously known tidal flow systems are believed to have poor denitrification performance, with the exception of a reciprocating tidal flow system as taught by Behrends (U.S. Pat. No. 5,863,433).

Lagoon wastewater treatment systems comprise large basins in which wastewater is retained for many days or weeks. Depending upon organic mass loading and design, lagoons may be anaerobic, aerobic, or facultative. A facultative lagoon typically has an upper layer that is aerobic and a lower layer that is anaerobic, as a result of stratification. Typically cyanobacteria or algae dominate such lagoons. Aerobic and anaerobic cycling may be diurnal in nature, depending upon photosynthesis and wind-induced mixing.

The advantage of lagoons is their low capital and operating costs. However, lagoons demand large land footprints, owing to the long residence times; in addition, they are not capable of achieving advanced treatment, typically reaching secondary treatment standards at best. Algal growth in lagoons often creates effluent total suspended solids (TSS) concentrations that are much higher in biological oxygen demand (BOD) and TSS than secondary treatment standards would permit, and the filtration of algae from lagoon effluent is difficult.

SUMMARY OF THE INVENTION

The present invention provides a system and method for treating wastewater, for example, municipal, agricultural, and industrial wastewater, to a predetermined level of purity. Another type of water that can be treated with the present invention includes storm water runoff from agricultural, suburban, and urban development.

The present invention comprises an integrated tidal vertical flow marsh (TVFM) treatment system and associated methods. In a particular embodiment the predetermined treatment level may comprise advanced secondary standards, which are defined as $BOD_5 \leq 20$ mg/L, $TSS \leq 20$ mg/L, and $NH_3 \leq 5$ mg/L. Storm water is generally considered as weak wastewater, and herein the term wastewater is intended to include storm water runoff.

A particular embodiment of a wastewater treatment system according to the present invention, not intended to be limiting, can include a first lagoon that has an inlet for receiving wastewater to be treated and a first vertical flow marsh cell that has an outlet adjacent a bottom thereof. A first means for transporting water from the first lagoon to a surface of the first marsh cell is provided.

The system can also include a second lagoon that has an inlet for receiving water from the first marsh cell outlet and a second vertical flow marsh cell that has an outlet adjacent a bottom thereof. A second means for transporting water from the second lagoon to a surface of the second marsh cell is provided.

Means for recycling at least a portion of the water exiting the second marsh cell outlet to the first lagoon can also be provided.

Throughout the subsequent discussion, the definitions of lagoon and marsh cell will be generally taken as follows: The first and the second lagoon are adapted to function essentially aerobically, and may contain plants having roots positioned to contact water flowing thereinto. The first and the second marsh cell are adapted to contain plants having roots positioned to contact water flowing thereinto.

The integrated TVFM treatment system of the present invention in a particular embodiment includes alternating marsh cells and lagoons implemented with hydraulic and process design aspects. The overall hydraulic regime in this system preferably involves fill and drain cycles wherein wastewater is alternately pumped between cells and lagoons. The vertical flux of water in and out of the marsh cells is designed to cycle over a predetermined period, and is therefore referred to as tidal. Hydraulic design in various embodiments integrates passive forward flow, tidal flow, and recycle flow into one system. It is believed that no such integration exists in the prior art.

The process design in various embodiments integrates wetland and lagoon treatment technology in an inventive way that represents an improvement over the existing state of the art in lagoon, wetland, and combined lagoon/wetland wastewater treatment systems. The process design of the present invention also includes elements of environmental and ecological engineering design that significantly improve the state of the art of wastewater treatment in general, and wetland wastewater treatment in particular.

Another aspect of the present invention comprises the tidal vertical flow (TVF) marsh itself as a treatment system that is capable of advanced simultaneous nitrification and denitrification. The basic biophysical mechanisms behind nitrification and denitrification are elucidated for the first time. A quantitative characterization of the bacterial community within the TVF system has been made. The TVF treatment system substantially outperforms conventional wetland treatment systems, and uses a smaller treatment footprint. Moreover, the process of tidal nitration inherent to tidal flow treatment systems is substantially more energy efficient than activated sludge systems, providing advanced biological nitrogen removal.

The TVF system of the present invention embodies a plurality of treatment pathways, employing a plurality of elements of the system. These pathways include, but are not intended to be limited to, mechanisms for eliminating ammonium and nitrite ions as follows:

1. Chemolithoautotrophic nitrification begins during the flood stage:

$$NH_4^+(soln) \rightarrow NH_4^+(abs\ on\ biofilm,\ soln)$$

Then, during the draining stage:

$$NH_4^+(abs\ on\ biofilm,\ soln) \rightarrow NO_3^-(acted\ on\ by\ bacteria,\ in\ the\ presence\ of\ O_2)$$

At the next flood stage:

$$NO_3^-(on\ biofilm) \rightarrow NO_3^-(desorbed\ into\ soln,\ acted\ on\ by\ bacteria,\ in\ the\ presence\ of\ organic\ C) \rightarrow N_2,\ NO_x\ (soln)$$

2. Heterotrophic nitrification begins, as above for (1), during the flood stage:

$$NH_4^+(soln) \rightarrow NH_4^+(abs\ on\ biofilm,\ soln) \rightarrow N_2\ (acted\ on\ by\ bacteria,\ during\ drain\ and\ flood\ stages)$$

3. Autotrophic denitrification begins during drain stage:

$$NO_2^-(acted\ on\ by\ bacteria,\ in\ the\ presence\ of\ inorganic\ C) \rightarrow N_2\ (primarily\ during\ flood\ stage)$$

It is acknowledged that the bacterially mediated pathways for nitrogen mass transfer that are presented herein are simplified summaries of more complex processes, and the present invention is not intended to be defined or limited by these pathways.

An embodiment of a TVF wastewater treatment system comprises a first, a second, and a third vertical flow marsh cell, each having an outlet adjacent a bottom thereof, particulate media, and plants having roots extendible into the media. As above, the roots and the media are positioned to contact water flowing into each marsh cell.

Means are provided for transporting water to be treated to a surface of the first and the second marsh cell, from the first marsh cell outlet to the second marsh cell surface, from the second marsh cell outlet to a surface of the third marsh cell, from the third marsh cell outlet to the first marsh cell surface for process recycling, and from the third marsh cell outlet to a discharge outlet, the water transporting means further comprising means for substantially emptying each marsh cell on a predetermined cycle for a predetermined time, for permitting aeration of contents of each marsh cell.

Another embodiment of such a wastewater treatment system comprises a tidal, sequential vertical flow marsh cell system, the marsh cell system comprising at least three marsh cells in serial forward fluid communication. Means are provided for distributing incoming wastewater to be treated to surfaces of the marsh cells, including at least the first and a second marsh cell, the second marsh cell immediately following the first marsh cell. Means are also provided for alternately flooding and draining each marsh cell for enhancing aeration of incoming water, the draining means further for enhancing aeration of contents of the marsh cells, the marsh cell contents including means for achieving substantially simultaneous nitrification and denitrification of the wastewater. Finally, means are provided for recycling a portion of water exiting a final marsh cell to the first marsh cell surface.

A particular embodiment of a method of the present invention, not intended to be limiting, can include the steps of subjecting wastewater to be treated to a first substantially aerobic environment containing aquatic invertebrates for a first time period and transporting water from the first aerobic environment to a surface of a first substantially aerobic/anoxic environment containing aquatic invertebrates and plants having roots for a second time period.

Water emerging from beneath the plant roots of the first aerobic/anoxic environment is next transported to a second substantially aerobic environment containing aquatic invertebrates for a third time period. Water from the second aerobic environment is then transported to a surface of a second substantially aerobic/anoxic environment containing aquatic invertebrates and plants having roots for a fourth time period.

At least a portion of the water emerging from beneath the plant roots of the second aerobic/anoxic environment is then recycled to the first aerobic environment.

Another aspect of a method of the present invention comprises the steps of providing at least three vertical flow marsh cells, in forward serial fluid communication with each other. Incoming wastewater is step fed onto surfaces of a first and a second marsh cell. A portion of water exiting a final marsh cell is recycled to the first marsh cell surface. Each marsh cell is alternately and periodically flooded and drained for enhancing aeration of incoming water. The draining step also enhances the aeration of contents of the marsh cells. The flooding and draining steps permit the marsh cell contents to substantially simultaneously nitrify and denitrify the wastewater.

A method of constructing a wastewater treatment system comprises the steps of establishing at least three vertical flow marsh cells in serial fluid communication. Each marsh cell has an outlet adjacent a bottom thereof, particulate media, and plants having roots extending into the media, the roots and the media being positioned to contact water flowing into each marsh cell.

Means are provided for step feeding wastewater to be treated onto surfaces of at least a first and a second marsh cell, for recycling water from a final marsh cell outlet to the first marsh cell surface, for transporting water sequentially from each upstream cell outlet to each downstream cell surface for transporting water exiting from the final marsh cell outlet to a discharge outlet, and for alternately flooding and draining each marsh cell for facilitating aeration of water being transported and of marsh cell contents and for facilitating the nitrification and denitrification of water by the marsh cell contents.

The first and the second marsh cells are predosed with a nitrifying activated sludge for providing an initial bacterial community thereto, the system then ready to accept incoming wastewater for treatment.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

DETAILED DESCRIPTION OF THE PREFERRED EMBODIMENTS

A description of the preferred embodiments of the present invention will now be presented with reference to FIGS. 1-13.

System Elements

Figure 1:
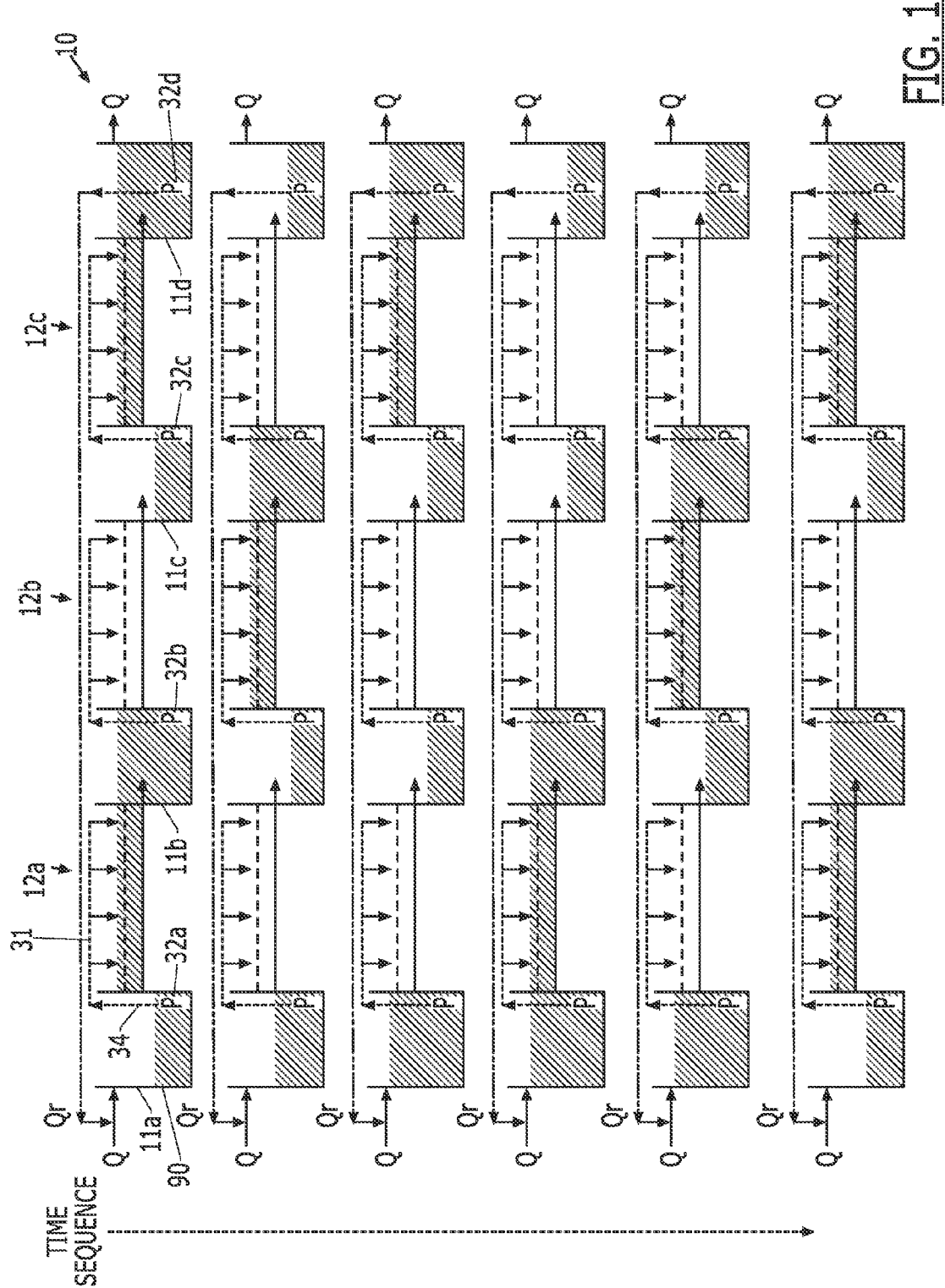
FIG. 1 is a schematic diagram of an exemplary time sequence of water flow between portions of the system of the present invention.

The integrated TVFM treatment system 10 in a particular embodiment comprises an alternating series of lagoons 11 and VF marsh cells 12, for example, marsh cells 12a-12c and lagoons 11a-11d, alternating as shown in FIG. 1. Q represents forward flow; $Q_r$, recycle flow. The overflow piping between marsh cells 12a-12c and lagoons 11a-11d is not depicted. The dashed horizontal line in the marsh cells 12a-12c represents the media/plant root surface. The overall hydraulic regime in the system 10 involves fill and drain cycles where wastewater is alternately pumped and flows between cells 12 and lagoons 11. The tidal vertical flux of water in and out of the marsh cells 12a-12c is designed to cycle over a predetermined period of, for example, at least once per day.

Means for transporting water between the lagoons 11a-11c and marsh cells 12a-12c alternately are provided, as well as recycling between the fourth lagoon 11d and the first lagoon 11a. These may comprise, for example, pump stations 32a-32d associated with each lagoon 11a-11d (FIG. 1). Generally waterflows from the marsh cells 12a-12c into their respective lagoons 11b-11d passively, as will be discussed in the following. The water levels in FIG. 1 illustrate how pumping in lagoons on either side of a marsh cell can operate to substantially completely drain the marsh cell, as in, for example, marsh cell 12b in the third step in the illustrated time sequence.

In some embodiments, a pump station alone may be used without an associated lagoon 11. Such a pump station may be positioned, for example, following the last marsh cell, and may comprise a terminal basin having a pump positioned therein. Basin 11d may serve such a function, for example, and may not comprise a lagoon in this embodiment.

Figure 2:
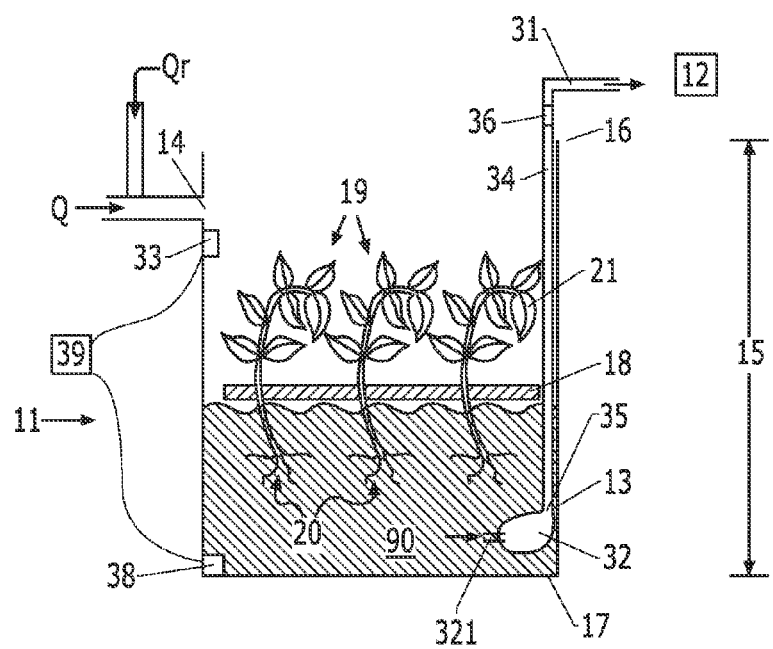
FIG. 2 is a cross-sectional view of an exemplary lagoon of the present invention.

In the embodiment shown in FIG. 2, for example, the pump 32 in the lagoon 11 has an intake 321 positioned lower in the lagoon basin 13 than the lagoon inlet 14. A level sensor 33 may be employed in certain embodiments for activating the pump 32 when a level of water in the lagoon 11 reaches a predetermined depth, for example, to prevent flooding.

In a particular embodiment (FIG. 1), the recycling pump 32d is adapted to recycle a water portion in a range of 50-1000% of the wastewater volume entering the first lagoon 11a per unit time.

Figure 3:
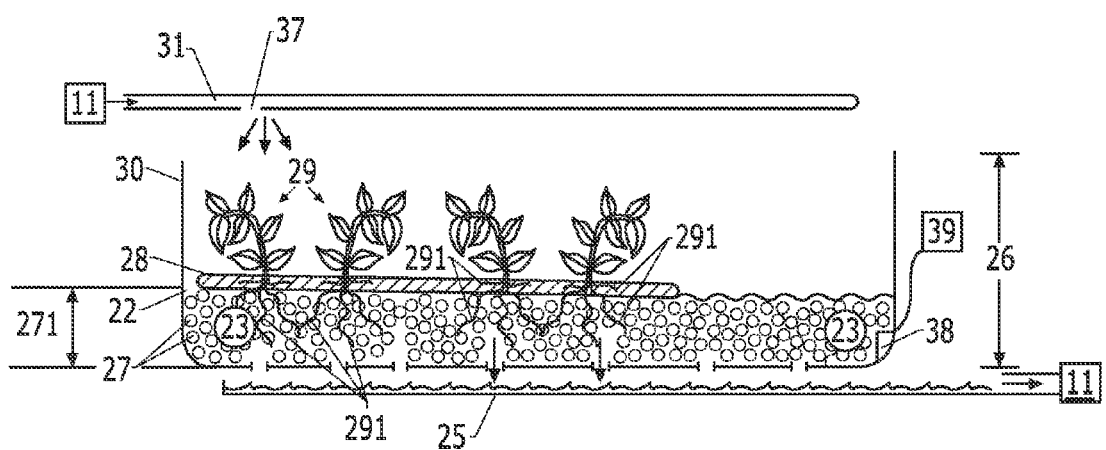
FIG. 3 is a cross-sectional view of an exemplary marsh cell of the present invention.

Piping 34 is also provided for connecting a pump discharge 35 with its downstream marsh cell 12. In a particular embodiment a check valve 36 can be positioned in the pipe 34 for permitting flow toward the marsh cell 12, and for preventing return flow. The piping 34 is in fluid communication with the distribution pipe 31, which has a hole 37 for delivering the water exiting the upstream lagoon 11 to the surface of the marsh cell 12 (FIG. 3).

A sensor 38 may also be provided for sensing a selected chemical parameter of the water in at least one lagoon 11 and a marsh cell 12. The sensor 38 can be in signal communication with a programmable logic controller (PLC) 39 to control activation of the pumps 32. Alternatively, the option for passive treatment remains, but the operator can optimize final effluent quality though a menu of options to manipulate pumping and aeration systems.

The present system 10 can be operated exclusively with a series of level sensors and the PLC 39. Alternatively, a supervisory control and data acquisition (SCADA) controller can be coupled with sensor instrumentation including, but not limited to, dissolved oxygen, oxidation reduction potential, turbidity, influent flow, ammonia, and nitrate, depending on system requirements. Control algorithms in the SCADA controller allow the system to automatically respond to variations in loading and flow or system upsets. Automatic control responses include, but are not limited to, frequency of marsh drain and fill cycles, aeration of lagoons, and passive forward flow.

Figure 4:
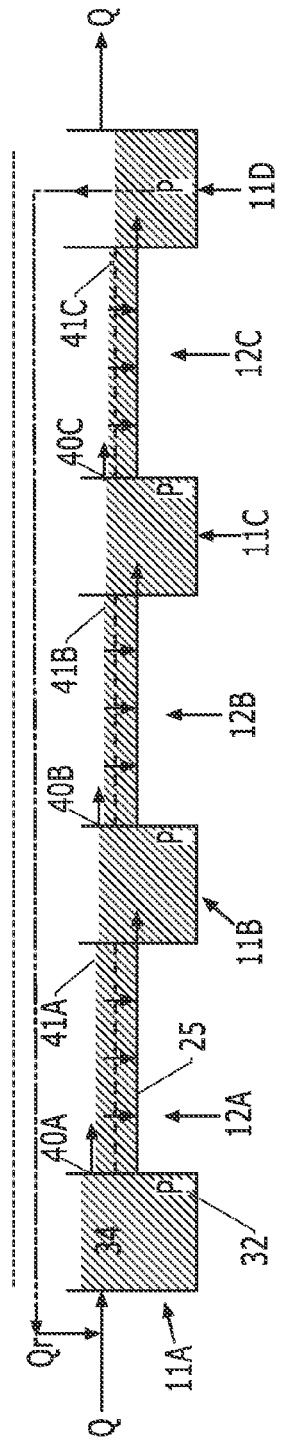
FIG. 4 is a cross-sectional view of an embodiment of the system of the present invention in passive flow mode.

In another embodiment, illustrated in FIG. 4, the outlets 40A-40C of the first through the third lagoons 11A-11C are positioned above the surfaces 41A-41C of the first through third marsh cells 12A-12C, respectively, for permitting gravity flow therebetween, as shown by the "hydraulic grade line" in FIG. 4, which is exaggerated for graphic clarity. Downward arrows depict flow through plant roots and media into the bottom drain 25.

Figure 5:
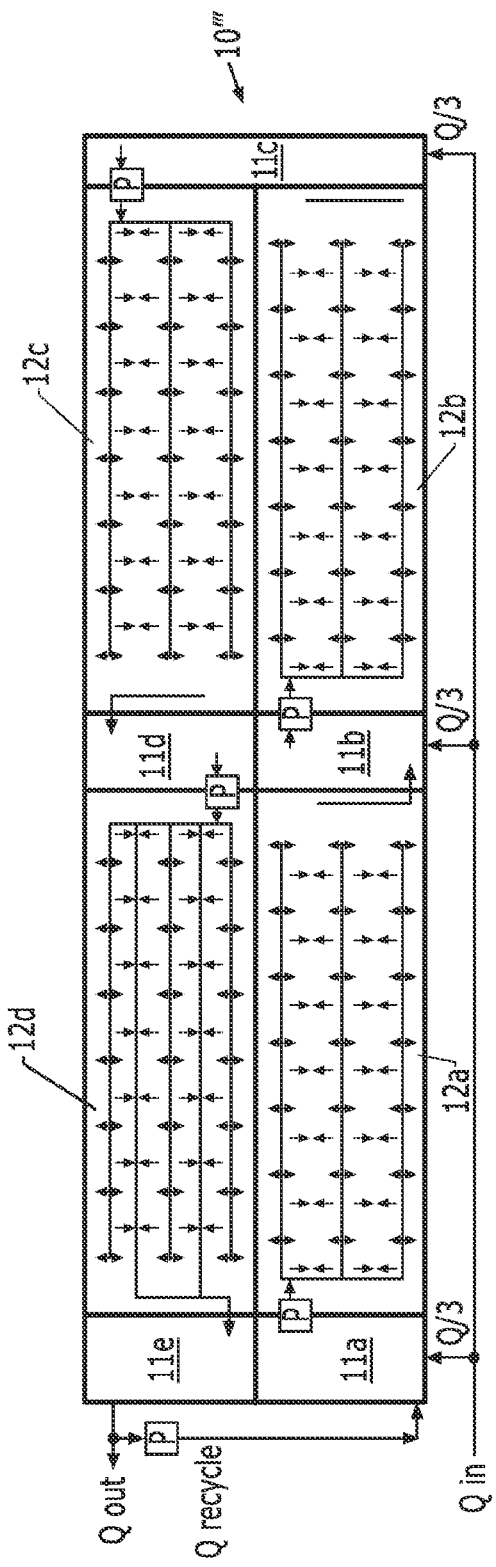
FIG. 5 is a plan view of an exemplary layout of the system of the present invention.

Another feature of the present invention comprises step feed, wherein at least one lagoon, second lagoon 11b, for example (FIG. 5), downstream of the first lagoon 11a, also has an inlet 42 for receiving wastewater to be treated in parallel with the first lagoon 11a, for reducing an influent mass loading on the first lagoon 11a. As illustrated in FIG. 5, the influent flow $Q_{in}$ is divided by 3 among the first three lagoons 11a-11c (Q/3) in the illustrative example of system 10''' depicted. The effluent is also shown as being divided between the flow exiting the system $Q_{out}$ and the flow channeled for recycling $Q_{recycle}$. In this embodiment an alternate physical arrangement of the component lagoons 11*a*-11*e* and marsh cells 12*a*-12*d* is illustrated. Here the path length for recycle flow $Q_r$ from the final lagoon 11*e* to the first lagoon 11*a* is minimized by arranging the flow to proceed in generally circular fashion about the system 10'''. In FIG. 5 the surface distribution system is shown by the outward-pointing arrows; the underdrain system is indicated by the inward-pointing arrows. It will be understood by one of skill in the art that the specific spacing of the distribution and underdrain system is determined as a site-specific design parameter.

Lagoons

Each lagoon 11 (FIG. 2) comprises a basin 13 that has an inlet 14 for receiving wastewater to be treated and an outlet 321 from which treated wastewater exits. The basin 13 has a depth 15 extending from a top 16 to a bottom 17. The lagoon 11 comprises a rafted plant rack 18 that can float upon a surface of the water 90 in the basin 13, the rack 18 adapted to support wetland plants 19 thereon so that the plant's roots 20 extend beneath the rack 18 and the leaves and stalks 21 extend above the rack 18. The lagoon 11 is adapted to support a population of grazers, primarily filter feeders.

Two ecological design elements of lagoons 11 in the system 10 are important to designing a stable filter-feeder community:aeration (either passive or active) and the rafted plants 19. Step feed is also an important ecological design element. Transfer of oxygen to bulk water is sufficient to maintain the positive dissolved oxygen concentration that is essential if lagoons 11 are to maintain populations of grazers, especially filter-feeding zooplankton. The means for ensuring sufficient oxygen transfer is site specific: In some cases, tidal turnover of the water column in lagoons 11 is sufficient; in others, supplemental mechanical aeration is required. The effect on treatment efficacy of maintaining positive dissolved oxygen concentrations in the lagoons 11 is profound. Because there is no clarifier recycling settled biosolids to the lagoons 11, unicellular bacterial or algal organisms dominate biomass conversion of wastewater nutrients. Filter feeders consume a large fraction of the bacterial or algal biomass produced in each pond, thereby reducing yield and particulate loading of a downstream marsh cell 12.

Floating aquatic plants having long roots, such as *Eichornia crassipes* (water hyacinth) and *Pistia stratoides* (water lettuce) can also be used in place of rafted plants; however, these fast-growing plants need to be regularly harvested. Rafted emergent wetland plants are believed at present to comprise a preferred embodiment.

Shading by the plant rack 18 reduces production of algae. In combination with short lagoon hydraulic retention times (<1 day) and the partial mixing provided by tidal flows, neither sun- nor shade-loving algae are provided with ideal growth conditions.

Plant root zones 20 harbor detritivores, sessile filter feeding, and free-swimming communities of grazers. Plant roots 20 significantly enhance grazer community diversity. Inclusion of habitats for both functional grazer types (filter feeders and detritivores) permits grazing intensity across a greater spectrum of biological and organic particles, both present in wastewater influent and generated within each lagoon 11.

Plants 19 provide refuge against predation and low-oxygen events. The plant root zone 20 is a kind of thicket in which prey can hide from predators. All grazers have predators. Not all predators are useful for particle removal.

Low-oxygen events may be caused by an organic overload or a power loss in aerated systems. Massive die-off of plankton during low-dissolved-oxygen events is a common observation in eutrophic water bodies. Aeration can prevent such a die-off, but plants can provide alternative protection mechanisms for some species of zooplankton. Certain zooplankton types (e.g., copepods) and detritivores (e.g., snails) are able to position themselves at the water-air interface on plant roots and thatch during anoxic events in the bulk water volume. By maintaining coverage with a thin film of water, these grazers are able to use atmospheric diffusion of oxygen to respire while preventing desiccation. When aerobic conditions are restored, these grazers migrate back into the root zone and open water. Die-off is thus mitigated. In contrast, an open water surface without rafted plants provides no means for these organisms to escape anoxic conditions of the bulk water volume, resulting in massive die-off of grazer populations.

Therefore, plants 19 form an essential refuge that assists biological particle size management by grazers. Stabilization of grazer populations by plant roots 20 is important. Without stable grazer populations yield reductions cannot reliably take place within the lagoons 11 of the system 10.

Plants 19 also help control populations of filamentous bacteria. The aerated lagoons 11 tend to favor growth of unicellular bacteria. However, intensive grazing of unicellular bacteria by filter-feeding zooplankton may provide a competitive advantage for growth of filamentous bacteria, since filamentous bacteria are not easily ingested by many filter-feeding zooplankton. If the grazing rate of unicellular bacteria is very high, and that of filamentous bacteria very low, then filamentous bacteria can escape competition for wastewater nutrients. Filamentous bacteria, however, tend to clump under high population densities. Plant roots 20 tend to sweep and hold clumps of filamentous bacteria. Detritivores inhabiting roots have jaw parts, enabling them to consume the filamentous bacteria. Thus coverage by plants with large masses of roots tends to provide a dynamic regulatory mechanism for filamentous bacteria.

Step feed with recycle affects both aeration and rafted plants. The lagoons 11 are partially mixed. Supplemental aeration may be needed in some cases, but the large dilution ratios provided by step feed with recycle substantially reduce the volumes of air needed to maintain positive dissolved oxygen, which in turn reduces the turbulence induced by aeration. This is beneficial because plant roots tend to grow longer and are better distributed in an inverse relationship to turbulence.

Step feed with recycle also induces plants to grow longer roots. Root length is inhibited by ammonia concentrations in excess of 5 mg/L. Step feed with recycle can reduce influent total Kjeldahl nitrogen (TKN) concentration to values close to 5.0 mg/L (Table 2). Influent ammonia concentrations are lower because much of the influent TKN is composed of organic nitrogen rather than ammonia. Therefore, plant roots in the lagoons 11 tend to extend a significant distance into the water column, supporting grazer communities that reduce yield in lagoons 11.

Inhibition of undesirable, toxin-producing cyanobacteria (blue-green algae) growth is an important effect that emerges from step feed, partial mixing, tidal fluxes, and stabilization of grazer communities. Cyanobacteria favor conditions of high nutrients, persistent habitats, light limitation brought on by self-shading, and a stable water column. The system 10 elements of mixing, tidal fluxes, step feed, stable grazing populations, and grazing have been observed to inhibit growth of cyanobacteria, which provides stability of the particle removal function of grazers.

Marsh Cells

Each marsh cell 12 (FIG. 3) in a particular embodiment comprises a basin 22 that has a hole, and preferably a plurality of holes 23, adjacent a bottom 24 thereof, the holes 23 serving as the marsh cell's outlet. A drain collection trough 25 is positioned beneath the holes 23 for collecting water exiting therefrom. The marsh cell 12 has a depth 26 that is less than that 15 of the lagoon 11. However, the volume of the lagoon 11 is preferably substantially smaller than that of the marsh cell 12.

The basin 22 is adapted to hold a particulate medium therein, such as an aggregate 27 preferably having a diameter no smaller than approximately 2 mm. The bulk density of the aggregate 27 is preferably <1000 kg/m$^3$. The low bulk density combined with an effective porosity of approximately 40% promotes penetration of roots 291 deep into the media 27, positively affecting populations of protozoan communities that feed on unicellular bacteria. The aggregate 27 can comprise, for example, a high-porosity plastic medium and/or expanded shale. In a particular embodiment, the depth 271 of media 27 in the basin 22 is no greater than approximately 4 feet.

A mat 28 that is adapted for permitting plants 29 to root 291 therein is positionable above the particulate medium 27 and in spaced relation from a top 30 of the basin 22. The mat preferably covers a substantial fraction of the media surface area. The mat 28 preferably comprises coir matting, (commercially available coconut fiber from coconut husks having a lignin content of approximately 45%, a geotextile fabric 28 with partially mature plants 29 already growing in it), within which the plants 29 are installed or seeded, and which is important in quickly establishing a marsh treatment ecosystem. The coir mat 28 promotes quick rooting in a horizontal direction, is an excellent medium for sprouting and growing seeds, and acts as a litter, or detritus, layer prior to the accumulation of plant litter to provide a moist surface layer in which detritivores find abundant food, habitat, and refuge from predation and environmental upsets.

Establishing substantially complete plant coverage of marsh cells 12 within one growing season is important to the function of the system. Plant shoots or plugs are typically planted on a grid pattern in constructed wastewater treatment wetlands. Pregrowth not only ensures rapid plant acclimation to the wastewater treatment system, but also establishes an "instant" ecosystem. Pregrowth of plants 29 is done in shallow ponds where invertebrate communities quickly colonize the coir/plant matrix 28/29. Even partial coverage of the marsh cells 12 results in rapid growth of plants 29 across the entire marsh cell 12 surface.

Water is distributed from a lagoon 11 across a surface of a respective downstream basin 12 by, for example, low-head distribution piping 31 such as, but not intended to be limited to, an irrigation pipe and an open channel distributor.

Figure 6:
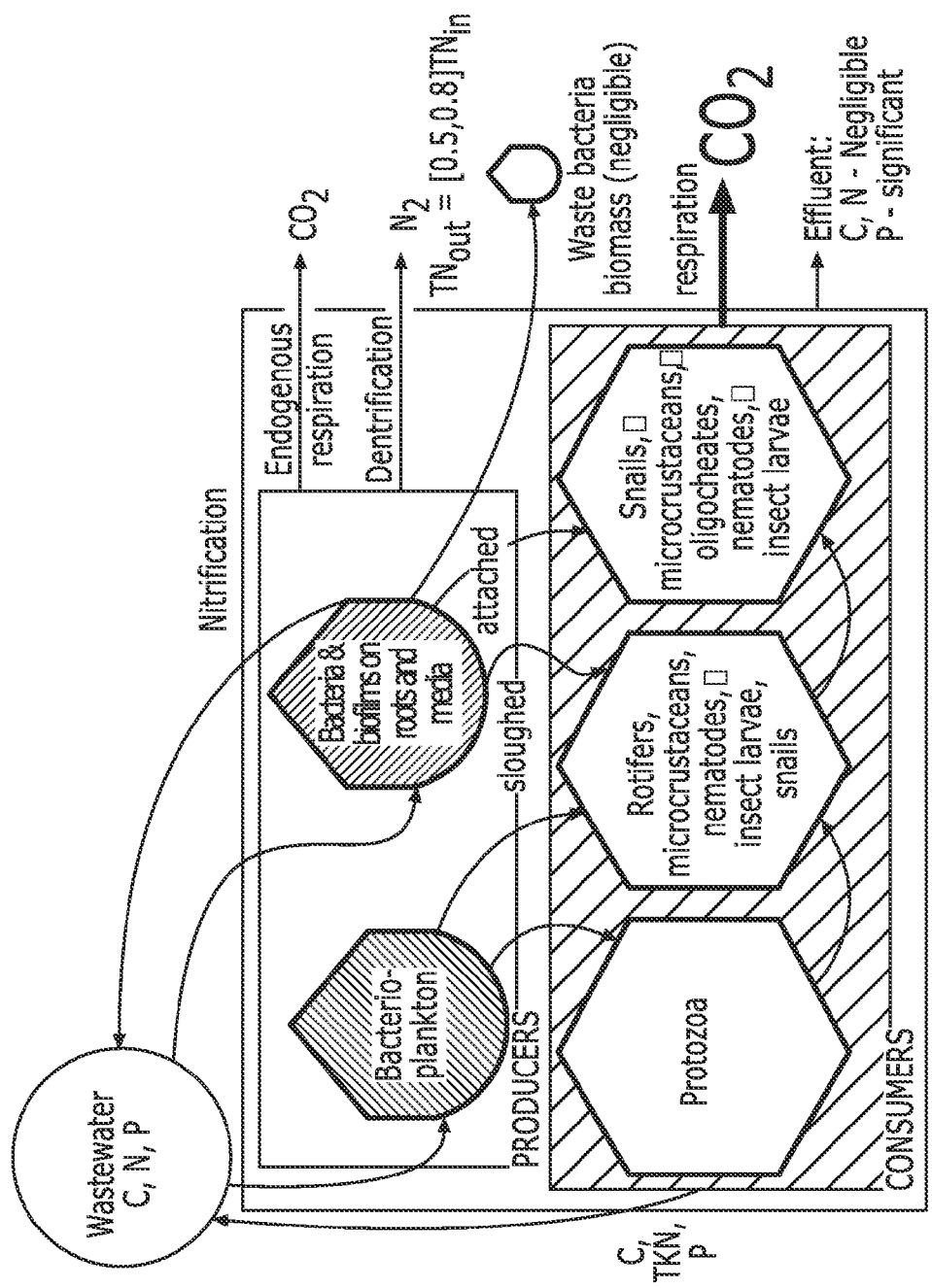
FIG. 6 illustrates a simplified trophic structure of the system of the present invention.

The marsh cell 12 is adapted to maintain a population of aquatic invertebrates, such as, but not intended to be limited to, detritivores. Knowledge of the habitat and feeding biology of aquatic invertebrates is used to inform the design of the system 10 in its use of aquatic invertebrate organisms to consume biological and organic particles present in wastewater and generated within the wastewater treatment system 10. Consumption of biological and organic particles by aquatic invertebrate grazers complemented by endogenous respiration of bacteria, is designed to almost entirely eliminate the need to remove biosolids (yield) from the system, by complex webs of consumption based on bacterial biomass (FIG. 6). The mechanism of yield elimination is transfer of organic carbon to atmospheric $CO_2$ via respiration of invertebrates.

The community structure (i.e., the diversity, population sizes, competitive relationships, and predator-prey relationships of constituent species) of these grazing organisms is self-organizing and can be highly complex, but is controlled by the large-scale mechanisms comprising the engineering design elements.

At a lower trophic level, an important element of ecological design takes into account the role of recently identified "novel" bacteria in the nitrogen cycle such as heterotrophic nitrifiers, aerobic denitrifiers, and autotrophic denitrifiers. Knowledge of both novel and classically identified bacteria provides essential insight into the physiological ecology of nitrogen mass transfer within biological systems. Concurrent with the discovery of "novel" bacteria in the nitrogen cycle has been the development of genetic techniques to characterize the bacterial community structure of biological treatment systems. These advances in knowledge enable the matching of process design and process operational protocol to the fundamental microbial ecology of the marsh cells 12.

Other important ecological design elements of marsh cells 12 include frequent aeration of marsh media 27 and plant root zones 291 by tidal water flux, periodic partial inundation of emergent aquatic macrophytes, which promote the emergence of a stable and diverse grazer community, and step feed.

Tidal fluctuation in marsh cells 12 draws air though and aerates roots 291 and marsh media 27. Aeration is beneficial in promoting nitrification of wastewater ammonia absorbed on biofilms and media. Prevention of persistent anaerobic conditions in marsh soils (media in this case) significantly enhances plant species diversity. Plant growth is favored by periodic aeration of marsh soils and promotes the formation of a thick, permeable root mat. Enhanced species diversity and plant growth promote dense standing vegetation. Dense standing vegetation provides large surface areas that are habitat and refuge for a diverse and large community of grazers. Increased plant growth also provides large surface areas for biofilms to form during the flooded phase of the tidal cycle; treatment surface area is thereby increased in the marsh cells. Marsh influent passes through standing vegetation and the root mat; particles retained on plant surfaces are subject intense grazing pressure. Aeration of media 27 prevents excessive build-up of bacteria biomass that could cause unacceptable headloss (as can be determined from the long-term persistence of design hydraulic conductivity in recirculating sand and gravel filters). Aeration of media 27 also promotes grazing of bacterial biomass that would tend to accumulate within media interstices. High population densities of grazers have been documented in aerobic sand. There is no fundamental difference biologically between aerobic sand and larger aggregate.

Periodic, partial tidal inundation of the marsh plants 29 is important to establish a diverse and large community of grazers. The plant/coir/media combination supports a large detritivore community as well as a free-swimming filter-feeding community. When the marsh 12 is drained, aquatic detritivores and filterfeeders find refuge in the coir mat, roots, and moist lower thatch. Terrestrial detritivores may feed at the marsh surface while the marsh cell 12 is drained, but find refuge from drowning while the cell is flooded by crawling up plant leaves and stalks. When the marsh cell 12 is flooded, free-swimming filterfeeders emerge from the root/coir mat to feed on suspended bacteria. Aquatic detritivores are free to feed on surfaces in the flooded zone.

The tidal flooding and draining of the present system 10 therefore provide a variety of ecological niches for grazers to exploit. In nature, tidal freshwater wetlands are known to have abundant and diverse populations of grazers because of this variety of niches. In the present system 10, the abundance and variety of grazers translates to removal of volatile suspended solids (VSS) by the grazer community.

Step feed and recycle have important effects on the ecology of the marsh cells 12 by creating a relatively weak marsh influent, causing a gradual, rather than rapid, onset of anoxic conditions within the marsh media 27 during the flooded phase, and maintenance of stable grazer populations that consume VSS. Some grazers, including protozoa, nematodes, and rotifers, which typically inhabit media interstices and surfaces, can withstand anoxic conditions of short duration or migrate along oxygen gradients to higher dissolved oxygen concentrations. Others, such as snails and copepods, can migrate to plant surfaces in contact with the atmosphere to obtain oxygen by diffusion. Rapid onset of anoxic conditions creates longer periods of exposure to anoxia for less motile grazers and less time for a behavioral response to anoxia by highly motile grazers.

A system effect of step feed emerges from tidal aeration of marsh cells 12 and enhanced growth of plants 29. As step feed promotes gradual onset of anoxic conditions within the marsh media, plants 29 are therefore minimally stressed by anoxia in the tidal cycle, contributing to the effects of periodic aeration noted above.

The large plant surface area in contact with water during the flooded phase of the tidal cycle is colonized by photosynthetic biofilms known as periphyton. Periphyton is sensitive to drying, but in a thick plant thatch much of it remains moist during the drained phase of the tidal cycle. During the flooded phase, periphyton oxygenates the free water above the media and roots. The tendency of bacterial respiration to remove oxygen from water is then counterbalanced in daylight by photosynthetic oxidation of the water column by periphyton. Large numbers of grazers have been observed swimming during the flooded phase while there are anoxic conditions in the media. Further observation reveals apparent significant production of oxygen bubbles from periphyton within the marsh cell. Grazers may consume VSS for longer periods, if not throughout, the flooded phase of the tidal cycle. Step feed therefore has significant emergent ecosystem effects that enhance removal of VSS.

Oxygenation by periphyton is especially important during periods of passive flow or delayed drainage. Establishing anoxic conditions for denitrification and positive dissolved oxygen concentrations to maintain grazer populations appear to be mutually exclusive functional requirements. However, simultaneous photosynthetic oxygen transfer promotes a positive dissolved oxygen concentration in the flooded free water surface while bacterial respiration in the media drives interstitial water to negative oxidation-reduction potential (ORP) values.

Lagoon-Marsh Interactions

The lagoon 11 and marsh cells 12 form an integrated treatment system 10, having important process interactions such as, but not limited to:

1. Each lagoon cell reduces BOD and particulate loadings of the immediately adjacent and downstream marsh cell.

2. Reduction of BOD and particulate loading of marsh cells maintains design hydraulic conductivity of marsh media.

3. Maintaining design hydraulic conductivity of marsh cells preserves design nitrification performance.

4. The ammonia concentration profile in lagoons cells decreases across the entire treatment system. Decreasing ammonia concentrations protect grazers from ammonia toxicity.

5. The unique lagoon—marsh configuration of the system 10 also has profound effects on the removal of biological particles: rapid recolonization of marsh cells by grazers and long-term stabilization of grazer particle removal performance.

Within the long-term operation of the system 10, events may result in local extinction of certain grazer populations, such as power outages, resulting in prolonged drying or inundation, or drying of a marsh cell 12 for maintenance. The grazer refuge of the lagoon cells 11 is inherently robust because of the rafts 18. Diverse populations of filter feeders and detritivores can find refuge over prolonged period of anoxia (such as might occur during power outages). Some of these grazer populations flow downstream to the next marsh cell and rapidly recolonize it, thereby reversing any degradation in biological particle removal performance.

Stabilization of long-term biological particle removal is a relationship between the ecology of biological particle growth, the sieving action of the marsh media/root bed, and the feeding ecology of grazers.

The present system 10 produces biological particles comprising mostly bacteria, not phytoplankton. The effect of grazing pressure on particle size class distribution is likely to be disjunctive, with bacterioplankton size class distribution following a distribution with size classes of $<50$ $\mu m^3$ (d=4.6 $\mu m$) and $>10^4$ $\mu m^3$ (d=57.3 $\mu m$). Bacteria flocs in excess of 50 $\mu m$ in diameter escape predation by most classes of filter feeders.

Biological particle disjunctive size class distribution is a problem for treatment systems comprising only lagoons in series. The present system 10 controls particle size distribution by sieving large particles in the marsh cells 12. Particles greater than 50 $\mu m$ in diameter are effectively filtered by vertical flow marsh cells 12, where they ultimately degrade or are consumed. Smaller particles are consumed by filter feeders in lagoon 11 and marsh cells 12. Biological particle size classes over approximately 0.1 $\mu m$ are subject to predation or filtration.

The alternation of lagoon 11 and marsh cells 12 that contain diverse and stable populations of grazers is an effective way to remove biological particles from the treatment system. Stable control and removal of biological particles not only produces low effluent TSS concentration, but also helps prevent clogging of marsh beds, thereby preserving the design hydraulic conductivity that is important to process design.

The system 10 design encompasses hydraulic and process elements, both of which contain novel elements and combinations thereof. Hydraulic design integrates passive forward flow, tidal flow, and recycle flow into one design. No such integration is known to exist in the prior art. Process design integrates wetland and lagoon treatment technology in a novel way that is an improvement over the existing state of the art by including elements of environmental and ecological engineering design that significantly improve the state of art of wetland wastewater treatment.

Hydraulic Design

Vertical flow marsh cells 12 in this embodiment are designed to fill to a level that creates a free water surface having an operating depth up to two feet. Free water surface depths up to four feet are acceptable for short durations.

In the embodiment of FIG. 1, influent enters the first lagoon(s) 11$a$ and associated pump station(s) 32$a$. The water level rises, triggering a level-sensing device that actuates a pump. The pump then transfers water from the lagoon 11$a$ (or other type of pretreatment basin) to the adjacent, downstream marsh treatment cell 12$a$. Alternatively, water may flow out of the lagoon (or pump station) via overflow piping (FIG. 4). Pipes used to transfer water downstream may have check valves that only permit forward flow.

The exact configuration of step feed of VF marsh cells 12 is a process determination based on influent mass loading. The hydraulic regime described herein is valid for any design.

Water is discharged into each VF marsh cell 12 via a distribution system 31 at the surface of the marsh media bed. The distribution system 31 may discharge influent substantially evenly over the surface of the VF marsh cell 12, as shown in FIGS. 1, 4, and 5, although this has been found neither necessary nor desirable, unless multiple points of influent are required to attenuate pumped water velocity sufficiently to avoid scouring of plants 29 and media 27. If a surface distribution system 31 is used, it typically is configured as a low-head system for energy efficiency. An example of low-head distribution piping is a large-diameter, slotted irrigation pipe such as that known for use in agricultural applications. An open-channel distribution system is another example of a low-head distribution system. Examples of low-head hydraulic conveyance machinery include axial flow propeller pumps and airlift pumps.

Influent flows from the piping 31 down through plant roots 291 and media 27. During a fill stage influent may not flow downward evenly throughout the cell 12 in all embodiments, but flow is substantially vertical during drainage. The underdrain piping system 25 collects water at the bottom of the VF marsh cell 12. Water collected in the underdrain system 25 flows into the adjacent, downstream lagoon 11 or pump station 32. The VF marsh cell 12 and downstream, adjacent lagoon 11 (or pump station 32) then fill to approximately the same water level. A small difference in water level may be caused by head loss in the VF marsh cell 12 and marsh drainage system 25.

A pump 32 conveys water from the lagoon 11 into the adjacent, downstream VF marsh cell 12 and then a downstream lagoon 11 (or pump station 32). As the pump 32 conveys water downstream, the water level is drawn down in the VF marsh cell/lagoon (or pump station) pair 12/11 being pumped. The water level may be drawn down sufficiently in the pumped lagoon 11 (or pump station 32) to dewater an adjacent, upstream VF marsh cell 12. Unless there is influent flow to the VF marsh cell 12 while drain pumping is in progress, the marsh media/root matrix 27/291 is drained to effective field capacity, wherein field capacity may be defined as the water retained in the marsh media/plant root matrix 27/291 after downward gravity drainage has ceased or has been reduced to a substantially insignificant trickle.

Pumping continues successively from one VF marsh cell 12 and lagoon 11 (or pump station 32) pair to the next such that some pairs may be full, some drained, and others filling (see, for example, the exemplary time sequence depicted in FIG. 1). The preferred minimum number of VF marsh cell 12 and lagoon 11 pairs is two; the preferred maximum number is a design decision determined by influent strength and desired effluent quality.

Pumping may be controlled by level-sensing devices linked, for example, to an electromechanical or programmable logic controller or by manual actuation from skilled operations personnel. Other sensing devices, such as, but not limited to, dissolved oxygen (DO) or ORP meters may also actuate pumps. Water from the final lagoon (or pump station) may be recycled at a rate of 50% to 1000% of forward flow, depending on process design, wherein "forward flow" is defined as the average daily flow rate of influent received by the system 10.

The periodicity of fill and drain cycles in a given marsh cell/lagoon pair 12/11 may be on the order of several times per day, weekly, or even longer time spans, depending on process design.

Pumping is not necessary for forward flow to pass through the system 10. Forward flow may also be passive, in an overflow mode, from marsh cell 12 to lagoon 11. Each lagoon 11 (or pump station 32) preferably has overflow piping. Water overflowing into the adjacent and downstream marsh cell 12 flows through the surface distribution system 31, and then down through plant roots 291 and marsh media 27 to reach the bottom drain collection system 25. From the bottom drain collection system 25, water flows into the adjacent and downstream lagoon 11 (or pump station 32). Water then flows into the next marsh cell 12, and so on, until discharge or recycle from the final lagoon 22 (or pump station 32). The overflow mode may be used for selected marsh cell/lagoon (or pump station) pairs 12/11 in the system 10, depending on design considerations.

Surge capacity is inherent to the hydraulic design. Lagoons 11 and free water surfaces in marsh cells 12 provide significant surge capacity even under passive forward-flow conditions. Lagoons 11 typically have significantly more surge capacity than marsh cells 12 per unit of area because of their greater depth and the lack of media therein. Surge capacity is believed important for wastewater peak flows and for stormwater treatment. For the latter, the first 1-2 inches of rainfall runoff over a given urban or semi-urban watershed could be treated in an appropriately sized system 10 without the need for separate detention basins.

Excessive head loss decreases pump energy efficiency and inhibits passive forward flow because water levels could back up in the treatment system 10 sufficiently to overflow containment. Hydraulic design can be used to minimize head loss by appropriate specification of larger-diameter pipe sizes, careful selection of marsh media 27, sufficient freeboard in VF marsh cells 12 and lagoons 11 (or pump stations 32), and other process design considerations to be discussed below. ("Freeboard" is the distance from the high water level to the top of a containment vessel, that is, the distance water must rise to overflow the containment vessel.) It is also important to ensure there is sufficient freeboard in VF marsh cells 12 and lagoons 11 to contain water backed up by dynamic head loss under surge flow conditions.

Introduction of wastewater into lagoon cells 11 and vertical flow in marsh cells 12 help resist head loss in marsh media 27 by inorganic fines. Some inorganic fines will inevitably be carried by influent wastewater into the system. Influent enters lagoons 11 by step feed. Because the lagoons 11 are partially mixed, inorganic fines will tend to settle out and not enter the marsh cells 12. Hydraulic conductivity is thus protected in the marsh cells 12. Extremely small inorganic fines that are carried into the marsh cells 12 are able to migrate vertically downward through the relatively larger interstices of the marsh media 27 and be carried out of the marsh cells 12, thereby preventing clogging of a marsh 12 by inorganic fines.

No tidal vertical flow wetland designs known have a gravity flow-through hydraulic. For tidal flow to occur, some kind of gravity or mechanical drain is necessary. By definition, a constant water level is not tidal. However, when tidal flow is considered within the context of an integrated system of marsh treatment cells 12, passive (gravity) forward flow of continuous level through VF marsh cells 12 may occur in part of the treatment system 10 while tidal flow occurs in other parts, or passive forward flow may occur in the entire treatment system for a transient period between tidal flow events. No other tidal or vertical flow treatment system is known to have this type of flow regime.

A major disadvantage of a purely reciprocating flow and other known VF wetland tidal series systems is that pumping must occur to induce downward vertical flow. When obligate pumping is required for all vertically loaded components, downward vertical forward flow through wetlands is lost when pumping is lost. Tidal fluctuation for wastewater process design is important. However, in these designs hydraulic and process design are tightly coupled because pumping is required for treatment to occur, and thus these systems cannot respond as effectively to fluctuations in hydraulic loading.

The capacity for passive forward flow provides significant hydraulic advantages:

1. Passive forward flow partially decouples process and hydraulic design. Some treatment processes may require only occasional tidal fluxes or fluxes over long periods. Passive forward flow therefore provides process and operational flexibility that obligate pumping does not, as well as saving electrical and equipment maintenance costs.

2. Passive forward flow is needed for practical application of tidal marsh technology. Municipal wastewater or surface water runoff treatment systems typically receive surge flows regardless of the type of collection system used. Wastewater treatment plants therefore must be designed to accept surge or peak flows. An obligate pumping system must provide surge pumping capacity and surge basins to avoid overflow events. In contrast, passive forward flow through VF marsh cells 12 and lagoons 11 provides inherent surge capacity within a treatment system 10 without the need for additional surge basins or surge pumping capacity. An integrated treatment system of the present invention need only have total treatment volume capacity sized to accept design surge or peak flows.

The integration of lagoons into VF marsh treatment systems provides cost-effective surge capacity. If surge capacity is entirely taken up in marshes, marshes must be oversized in surface area because marshes are restricted in depth. Larger surface area entails the additional capital expenses of larger distribution and underdrain systems, more excavation, greater land use with associated real estate costs, larger volumes of marsh media, and increased planting costs. Lagoons, in contrast, can be excavated deeper, to accept surge flows. Every three feet of depth (0.91 meters), for instance, in a one-acre (0.41 hectare) lagoon will hold one million gallons (3,785 cubic meters).

Free water surfaces in marsh cells create surge capacity. Marsh aggregate media typically has a pore volume that is approximately 40% of the bulk media volume. Designing in a free water surface into the marsh permits retention of 326,000 gallons per acre-foot. Because ecological process design permits operating free water surface depths of two feet, and transient free water surface depths up to four feet, each acre of marsh can accept over one million gallons of surge capacity in free water surface alone. All this surge capacity will operate with passive forward flow if needed until normal tidal flow operating conditions are resumed.

Step feed is an important improvement on hydraulic design of wetland treatment systems. Wastewater treatment wetlands typically employ a plug flow design. No known tidal vertical flow wetland designs has used a step feed design. Because step feed has such profound effects on process design, it is not believed to be a mere engineering improvement.

Finally, important improvements to hydraulic design are the mechanisms for inducing endogenous respiration. The combination of tidal flux in marsh cells and recycle of effluent that is essentially free of labile carbon to the front end of the system 10 of the present invention induces a higher rate of endogenous respiration than by drainage alone.

Process Design

The system 10 of the present invention is adapted to receive influent wastewater containing many constituents that are removed by a variety of mechanisms while flowing through the treatment system (Table 1).

Effect of Hydraulic Design on Process Design

Vertical-flow wetlands are significantly less prone to clogging than are horizontal subsurface flow wetlands, since a large portion of the root mass grows parallel to flow paths. Vertical flow paths permit fine inorganic particles to migrate downward into the collection system 25 and out of the marsh cell 12, helping to prevent clogging of interstitial media pore spaces. Tidal fluctuation aerates media biofilms, which also helps prevent media interstitial pore spaces from filling with bacteria biomass. Vertical-flow wetlands can clog, however, as a result of high organic loading on fine sand and soil media.

The present system embodiments 10,10',10" preferably use aggregates 27 no smaller than one-millimeter ($d_{10}$) nominal diameter for tertiary treatment and no smaller than four millimeters ($d_{10}$) nominal diameter for primary and secondary treatment. Primary, secondary, and tertiary treatment are terms that are most meaningful in the context of activated sludge treatment. Here primary and secondary are taken to refer to wetland/lagoon cells with wastewater that is just beginning treatment (primary) or still retains $BOD_5$ or TSS concentrations on the order of 30 mg/L. Tertiary treatment refers to effluent being treated to $BOD_5$ or TSS concentrations to substantially less than 30 mg/L and that is undergoing substantial nitrification. The uniformity coefficient, which is a measurement known in the art of a diameter size range of individual particles in a given batch of media, is less than or equal to 4, with a value of less than or equal to 2 preferred. In some applications, high-porosity plastic media, having a pore volume fraction of at least 80% of the media bulk volume, may comprise part of the marsh media 27. These media specifications, which are intended as exemplary and not as limitations, allow drained resting periods as short a few minutes without significant loss of hydraulic conductivity due to accumulation of biomass in interstitial pore spaces.

The type of aggregate material selected can also increase hydraulic conductivity. A preferred aggregate is expanded shale, having a low bulk density, 55 to 60 lbs/ft$^3$, although this is not intended as a limitation. Low bulk density permits easier penetration by plant roots, and root penetration into expanded shale aggregate marsh beds has been observed to extend beyond 2 feet after only a few months of growth. As noted above, penetration by plant roots increases hydraulic conductivity.

Lagoons are another element of hydraulic design that significantly affect process design. Lagoons serve as a refuge for zooplankton and other invertebrate grazing organisms that consume bacterial biomass generated from wastewater nutrients.

marsh media (see FIG. 5, for example). Reduction of clogging in the marsh cells promotes flexibility and efficiency in system design.

Recycle with step feed permits high nominal recycle ratios for marsh cells receiving influent wastewater. Even modest recycle rates ($Q_{recycle} \leq 3Q$) with step feed create high recycle ratios that significantly dilute influent wastewater (Table 2). Dilution of high-strength influent partially

TABLE 1

Fate of Wastewater Constituents in Integrated TVFM Treatment System

| Influent Wastewater Constituents | Initial Fate in Integrated TVFM System | Final Fate in Integrated TVFM System |
|---|---|---|
| $BOD_5$ | Aerobic/anoxic conversion to bacteria biomass (VSS) in initial lagoons (bacterioplankton)/tidal vertical flow marshes (biofilms & bacterioplankton) | Conversion to $CO_2$ from endogenous aerobic respiration in drain cycle of tidal vertical flow marsh cells<br>Conversion to $CO_2$ by grazer biomass in lagoons/tidal vertical flow marsh cells |
| TKN | Conversion to $NH_4^+$ in initial lagoons and vertical flow marsh cells | Greater than 95% conversion to $NH_4^+$ by final lagoon/VF marsh cells |
| $NH_4^+$ | Sorption on marsh cell media, biofilms, organic material, and plant roots<br>Aerobic conversion (nitrification) to $NO_3^-$ in marsh cell biofilms with exposure to atmospheric oxygen when marsh cells are drained<br>Oxidation by anaerobic ammonia oxidizing bacteria | Substantially complete conversion to $N_2$ by bacterial respiration |
| $NO_3^-$ | Desorption from biofilms into bulk water when marsh cells are flooded<br>Conversion to $N_2$ (denitrification) in initial lagoons/tidal vertical flow in flooded marshes<br>Both aerobic and anoxic denitrifying heterotrophic bacteria likely to be responsible for this process | Substantially complete consumption of nitrate by discharge |
| TSS | Inorganic constituents filtered out in tidal vertical flow marshes | Inorganic constituents filtered out in tidal vertical flow marshes |
| VSS | Conversion to $BOD_5$ and TKN in initial lagoons/tidal vertical flow marshes<br>Recalcitrant VSS filtered out in tidal vertical flow marshes | Conversion to $CO_2$ from endogenous aerobic respiration in drain cycle of Tidal VF marsh cells<br>Conversion to $CO_2$ from endogenous aerobic respiration when flooded by recycle from final marsh cell that is essentially free of labile carbon<br>Conversion to $CO_2$ by grazer biomass in lagoons and tidal VF marsh cells |
| Human Enteric Pathogens | Helminth ova (20-70 μm) consumed by crustacean zooplankton and larger filter feeders<br>Protozoan cysts (1-30 μm) consumed by rotifers, crustacean zooplankton, and larger filter feeders<br>Bacteria (0.3-10 μm) consumed by protozoa, rotifers, crustacean zooplankton, and larger filter feeders<br>Viruses (0.02-0.08 μm) probably unaffected by grazing or filter feeding | Continuation of initial process to complete minimum two-log removal (99%) of helminth, protozoan, and bacterial pathogens<br>Limited die off of human enteric viral pathogens in drain and fill cycles of VF marsh cells |

Hydraulic design is also employed to minimize clogging and support robust ecological communities. Step feed and recycle have significant effects on both processes. Step feed distributes influent mass loading of marsh cells over a much larger surface area, thereby greatly reducing clogging of buffers populations of grazing organisms from low dissolved oxygen concentrations and high ammonia concentrations. Large, stable populations of grazing organisms consume organic materials and bacterial biomass that might otherwise tend to clog wetland media.

TABLE 2

Effect of Step Feed and Recycle on Influent Parameter Concentrations

Effect of Nominal Dilution Ratio on Influent Concentration in Receiving Lagoon Cells

| Param. | Influent Conc. | Lagoon 1 3:1 | 6:1 | 9:1 | Lagoon 2 4:1 | 7:1 | 10:1 | Lagoon 3 5:1 | 8:1 | 11:1 |
|---|---|---|---|---|---|---|---|---|---|---|
| BOD, mg/L | 250 | 83 | 42 | 27 | 63 | 36 | 25 | 50 | 31 | 23 |
| TKN, mg/L | 50 | 17 | 8 | 6 | 13 | 7 | 5 | 10 | 6 | 5 |
| TSS, mg/L | 120 | 40 | 17 | 13 | 30 | 14 | 12 | 24 | 13 | 11 |

Dilution also stimulates endogenous respiration of biofilms because it causes low concentrations of labile carbon in bulk water. Endogenous respiration of biofilms prevents excessive build-up of bacterial biomass, thereby tending to preserve the hydraulic conductivity of the media beds.

Hydraulic design also substantially affects process design as measured by ORP, DO concentrations, pH, and turbidity.

An exemplary embodiment of the present invention comprises a TVF system 10' (FIG. 7) comprising five marsh cells 12a'-12e' and five drainage sumps 32a'-32e' that treat 500 gpd of manufactured wastewater (powdered cheese whey and 98% urea fertilizer pellets). In this embodiment the drainage sumps are scaled to the surface area and volumes of lagoon cells 11 for larger systems 10. Influent (WW in) is fed substantially equally into marsh cells 12a'-12c' that are drained by sumps 32a'-32c', respectively. Marsh cells 12d', 12e' receive discharge from sumps 11c',11d', respectively, and are drained by sumps 32d',32e', respectively. Approximately 4000 gpd are recycled from sump 12e' to marsh cell 12a'. The treated water not recycled exits at the outlet discharge (W out).

Although the first three marsh cells 12a'-12c' receive substantially the same mass loading, the third cell 12c' is clearly the most heavily loaded, as measured by ORP and DO (Table 3). Distribution of influent wastewater by step feed elevates ORP and DO in marsh cells 12a',12b', reducing instantaneous mass loading, as can be seen in comparison with the ORP and DO values in marsh cells 12a',12b' when cell 12a' is point loaded (no step feed) with all influent wastewater (Tables 3 and 4). The observed mean ORP values in step-fed marsh cells are above those associated with sulfur-reducing bacteria that produce hydrogen sulfide (H$_2$S), whereas mean ORP values in cell 12a' receiving all influent are within the range of H$_2$S production. Strong H$_2$S odors were observed emanating from marsh cell 12a' during the period of the ORP measurements represented in Table 4.

TABLE 3

Effects of Step Feed and Process Recycle on Key Process Parameters in a TVFM System

| | | DO, mg/L | ORP, mV | pH | ntu |
|---|---|---|---|---|---|
| Sump 32a' | mean | 0.4 | 26.4 | 8.8 | 12.8 |
| | n | 282 | 282 | 282 | 282 |
| | Stdev | 0.3 | 51.4 | 0.3 | 3.2 |
| | Max | 2.1 | 430.0 | 10.3 | 32.2 |
| | Min | 0.0 | −199.0 | 7.9 | 2.8 |
| Sump 32b' | mean | 0.5 | 105.5 | 8.6 | 16.7 |
| | n | 324 | 324 | 324 | 321 |
| | Stdev | 0.5 | 76.3 | 0.2 | 10.1 |
| | Max | 3.2 | 425.0 | 10.3 | 143.8 |
| | Min | 0.0 | −230.0 | 7.6 | 3.2 |

TABLE 3-continued

Effects of Step Feed and Process Recycle on Key Process Parameters in a TVFM System

| | | DO, mg/L | ORP, mV | pH | ntu |
|---|---|---|---|---|---|
| Sump 32c' | mean | 0.3 | 55.5 | 8.7 | 15.2 |
| | n | 290 | 290 | 290 | 276 |
| | Stdev | 0.4 | 130.3 | 0.4 | 5.0 |
| | Max | 3.4 | 502.0 | 10.6 | 57.0 |
| | Min | 0.0 | −215.0 | 7.3 | 3.2 |
| Sump 32d' | mean | 1.2 | 395.2 | 7.5 | 9.8 |
| | n | 191 | 191 | 191 | 178 |
| | Stdev | 0.5 | 116.6 | 0.2 | 2.1 |
| | Max | 3.6 | 553.0 | 8.5 | 23.8 |
| | Min | 0.0 | −131.0 | 6.8 | 4.0 |
| Sump 32e' | mean | 2.4 | 523.6 | 7.6 | 6.8 |
| | n | 428 | 428 | 428 | 427 |
| | Stdev | 0.7 | 33.1 | 0.1 | 3.1 |
| | Max | 4.4 | 572.0 | 8.1 | 41.0 |
| | Min | 0.4 | 358.0 | 7.3 | 3.3 |

TABLE 4

Effect of Point Loading (No Step Feed) to First Marsh Cell

| | Sump 32a' | | Sump 32b' | |
|---|---|---|---|---|
| | DO, mg/L | ORP, mV | DO, mg/L | ORP, mV |
| Mean | 0.1 | −45.6 | 0.1 | 135.8 |
| n | 91 | 91 | 92 | 92 |
| Stdev | 0.2 | 30.6 | 0.1 | 60.7 |
| Max | 1.5 | 83 | 0.7 | 207.0 |
| Min | 0.0 | −90 | 0.0 | −65.0 |

Elimination of H$_2$S production is an important result of step feed and recycle. Hydrogen sulfide is poisonous to many microorganisms, particularly protozoa and invertebrates, is stressful to plants, and is also toxic to humans.

Dilution of influent wastewater nitrogen species concentrations (TKN, NH$_3$, and TKN) also has a positive impact on root length, which in aquatic plants is commonly inversely proportional to ammonia and nitrate concentrations. High influent ammonia and nitrate concentrations result in aquatic plants (in most species) with short roots.

High ORP values and positive DO recycled from sump 32e' of marsh cell 12e' to marsh cell 12a' elevate ORP and DO concentrations in marsh cell 12a'. Elevation of ORP and DO increase treatment rate processes in marsh cell 12a', which increases overall treatment rates. As shown by the following calculation:

$$RF \times Q \times DO_{eff} = g\ O_2\ \text{recycled per day} \quad (1)$$

where Q is the influent flow of 1.89 m$^3$/d, RF is the recycle factor, $Q_r = Q \times RF = 8 \times 1.89$ m$^3$/d = 15.12 m$^3$/d, and $DO_{eff}$ is the mean DO concentration, 2.4 mg/L. Recycle from the final marsh cell 12e' to the first marsh cell 12a' thus adds approximately 36 g O$_2$/d to the first cell 12a'. 36 grams of oxygen per day represents 10-15% of the bulk water oxygen demand of the system 10' (see Table 5). Increase of oxygen to the heavily loaded initial cells is directly proportional to recycle rates.

TABLE 5

Comparison of TVFM Performance with
Known Systems for BOD < COD, and TN (mg/L)

|  | TVFM | TVFM | '433 | '433 | '433 | '433 | a | a | b | b, % removal |
|---|---|---|---|---|---|---|---|---|---|---|
| HRT, d | 1 | 1 | 1 | 1 | 8 | 8 | 7 | 7 | 4 | 4 |
| $BOD_{in}$ | 376 |  | NR |  | NR |  | 528 |  | 1100 |  |
| $BOD_{eff}$ | <4.0 | 98.9% | NR |  | NR |  | 9.5 | 98.2% | 26 | 97.6% |
| $COD_{in}$ | 1072 |  | 2500 |  | 2500 |  | 605 |  | 1465 |  |
| $COD_{eff}$ | <10 | 99.1% | 1053 | 57.9% | 72 | 97.1% | 142 | 76.5% | 71.3 | 95.1% |
| $TN_{in}$ | 26 |  | 27 |  | 27 |  | 111 |  | 334.8 |  |
| $TN_{eff}$ | 3.2 | 87.7% | 2.65 | 90.2% | 2.35 | 91.3% | 45.7 | 58.8% | 207.3 | 38.1% |
| $TSS_{in}$ | <50 |  | NR |  | NR |  | 160 |  | 667 |  |
| $TSS_{eff}$ | 5 | ~90% | NR |  | NR |  | 19 | 88.1% | 118 | 82.3% | a. C. Tanner et al., 1999, Ecological Engineering 12, 67-92.
b. G. Sun et al., 1999, Water Sci. Tech. 40(3), 136-46.

A particular goal of the present invention is to provide up to advanced tertiary treatment, and advanced secondary treatment at a minimum. Wastewater can contain many constituents. Constituents of concern for the present system design are BOD, VSS, TSS, TKN, ammonia ($NH_4^+$), nitrate ($NO_3^-$), total nitrogen (TN=TKN+$NO_3^-$), total phosphorus (TP), and pathogens. These constituents are removed from wastewater in the present system as described in Table 1.

In systems having both marsh cells 12 and lagoons 11, most treatment takes place within the marsh cells 12 because of the large surface area of biofilms associated with media 27 and plants 29. Lagoons 11 can provide important treatment functions in service of the function of the marsh cells 12, but typically only need to be significantly smaller than the marsh cells 12, although this is not intended as a limitation.

Figure 7:
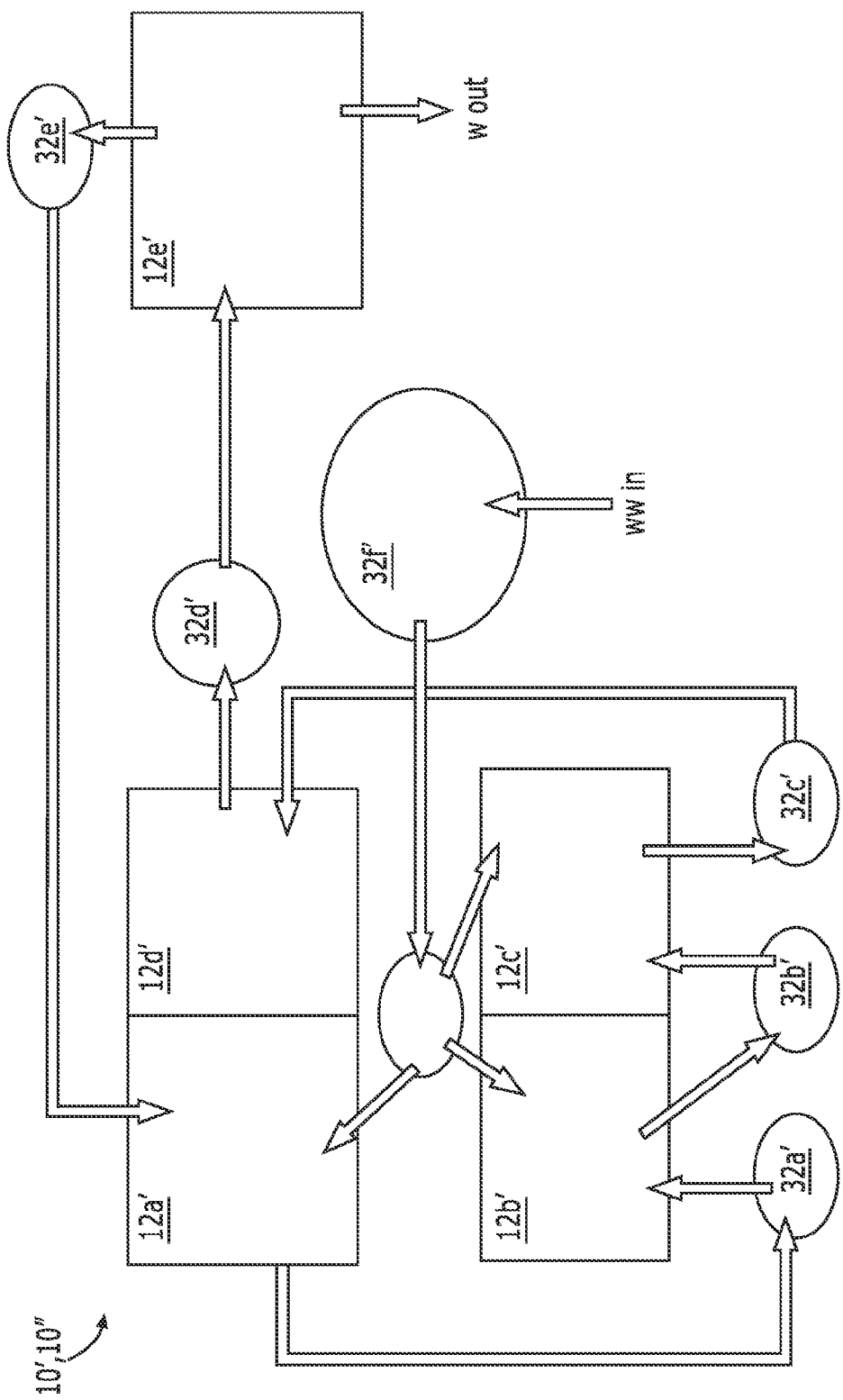
FIG. 7 is a schematic plan view of an embodiment of a marsh system.

A second study has explored total nitrogen removal performance in a tidal marsh system comprising a second embodiment of the invention 10", comprising a five-cell TVF marsh system treating manufactured wastewater (Table 6, FIG. 7), located in Taos, N. Mex., at an altitude of 2100 meters. In a further embodiment, a sixth cell (not shown) may be added, between the fourth and the fifth. In FIG. 7, the underdrain system is not depicted, recycle and influent distribution are single-point, and the marsh cells 12a'-12e' have substantially equal volumes. The TVF marsh system 10" operates in a serial flood and drain mode using a SCADA controller with pressure transducer input to operate 115-W sump pumps that drain and fill wetland cells. Progressive treatment occurs with water flowing serially from an upstream cell outlet to the next downstream cell's surface. Typically, at least two cells are drained and at least two are flooded at any one time. Influent is dosed equally into the first three cells 12a'-12c' from sump 32f' with process recycle from the final 12e' to the first 12a' cell. There is no aeration machinery. The number of fill and drain cycles varied approximately between 1 and 20 cycles per day, with an average of 8 during the period of the study from which the present data are reported.

TABLE 6

Tidal Marsh System Design Summary

| | |
|---|---|
| Influent flow | Mean = 1.7 (s = 0.5) $m^3$/d metered in by a four-channel irrigation timer into the dosing sump |
| Process recycle | 3:1-14:1 from final to first cell |
| Flow regime | Downflow flood and drain |
| Hydraulic residence time | Average, 24 h |
| Manufactured wastewater constituents | 1. Dried cheese whey<br>2. 98% urea pearls<br>3. Well water |
| Nominal (calculated) mean influent strength | 1. COD: 564 mg/L<br>2. BOD: 402 mg/L<br>3. TKN: 38 mg/L<br>4. $NO_3$: 3.0 mg/L (well water concentration)<br>5. TP: 2.6 mg/L<br>6. TSS: <50 mg/L |
| Mass dosing schedule | Daily, metered over 24 h by a mechanical belt feeder |
| Total wetland area (five cells) | 8.9 $m^2$ (96 $ft^2$) |
| Media depth | 0.6 m (2.0 ft) |
| Media type | 9.5 × 2.4 mm expanded shale. Uniformity coefficient <4 (Slightly modified ASTM C-330) |
| Plant surface coverage | 100% |

Light for plants was provided with skylights and 1000-W metal halide lamps on reciprocating linear tracks. The SCADA system turned lights on and off on 12-hour cycles. Non-natural illumination means are used when natural lighting conditions are insufficient to sufficiently support plant growth.

The marsh cells 12a'-12e' are planted with pre-grown mats of wetland plants growing in coir mats. Marsh cells were also inoculated with muck and water from a local pond as well as five gallons of biosolids from the clarifier of the local wastewater treatment plant.

Organic and reduced nitrogen (TKN), nitrate, and nitrite were monitored across the system. Nitrification and denitrification were directly and indirectly tracked with an in situ multi-probe unit (Hydrolab DataSonde®) programmed to take and log readings every 15 minutes. Parameters measured were ammonia (ISE probe), DO (ISE probe), ORP (platinum reference electrode), pH, turbidity (ntu), temperature, and conductivity.

Turbidity of tertiary effluent at low values (ntu<10) correlates with low effluent $BOD_5$ and TSS concentrations. Thus turbidity values in the system 10" provide a qualitative indication of the available organic carbon in the recycle. One can infer from low effluent turbidity that there is little organic carbon available in process recycle for heterotrophic denitrification.

Conductivity readings were used to determine submergence of the probe. Exhaust gas samples from wetland reactors 12a'-12e', to show evidence of denitrification, were gathered from bubbles emerging from the marsh cell underdrain system into drainage sumps 32a'-32e'. Biofilm bacteria were characterized by fluorescent in situ hybridization (FISH) genetic probes.

Standard analyses are presented in Table 7. The effect of recycle can be readily observed in the relatively flat distribution of parameter concentrations across all drainage sumps.

TABLE 7

Standard Analyses, Mean Values from Grab Samples Taken at the Drainage Sump of Each Marsh Cell

| Parameter, mg/L | Influent | Sump 32a' | Sump 32b' | Sump 32c' | Sump 32d' | Sump 32e', effluent |
|---|---|---|---|---|---|---|
| $BOD_5$ | 428 | 12.0 | 8.2 | 18.4 | 6.8 | 5.2 |
| n | 9 | 9 | 9 | 9 | 9 | 9 |
| s | 181.5 | 22.3 | 7.9 | 30.9 | 7.9 | 7.0 |
| TN | 48 | 9.6 | 9.2 | 8.2 | 8.1 | 8.3 |
| n | 9 | 9 | 9 | 9 | 9 | 9 |
| s | 7.6 | 7.0 | 6.8 | 6.4 | 6.5 | 7.2 |
| $NO_3^-$—N | 3.0 | 6.2 | 5.7 | 5.1 | 6.0 | 7.0 |
| n | | 9 | 9 | 9 | 9 | 9 |
| s | | 7.6 | 5.4 | 6.3 | 6.8 | 7.7 |
| $NO_2^{-2}$—N | Not sampled | 0.05 | 0.30 | 0.35 | 0.27 | 0.13 |
| n | | 9 | 9 | 9 | 9 | 6 |
| s | | 0.0 | 0.6 | 0.7 | 0.5 | 0.20 |
| TKN-N | 45 | 3.4 | 3.5 | 3.2 | 2.0 | 1.3 |
| n | 9 | 9 | 9 | 9 | 9 | 9 |
| s | 7.6 | 3.9 | 3.0 | 1.9 | 1.1 | 1.2 |
| TSS | Not sampled | 9.8 | 7.1 | 6.1 | 5.8 | 3.5 |
| n | | 8 | 8 | 8 | 8 | 8 |
| s | | 12.7 | 9.1 | 7.3 | 6.1 | 2.1 |

As can be seen in the TKN removal data, there was little variability in nitrification. The PLC logic structure governing flood and drain protocol was not optimized for denitrification during this study.

Hydraulic loading of the TVF marsh system 10" was 191 $L/m^2$ (4.7 $gal/ft^2$). Mass $BOD_5$ loading was 81 g $BOD_5/m^2$ (720 lbs $BOD^5$/acre). The volumetric nitrification rate, as measured by TKN reduction, was 14.7 $g/m^3$ media/day (s=3.9 $g/m^3/d$), and the areal rate was 8.3 $g/m^2/day$ (s=2.2 $g/m^2/d$). Volumetric total nitrogen removal was 13.0 $g/m^3$ media/day (s=2.8 $g/m^3/d$), and the areal rate was 7.5 $g/m^2/day$ (s=1.6 $g/m^2/d$).

Figure 8:
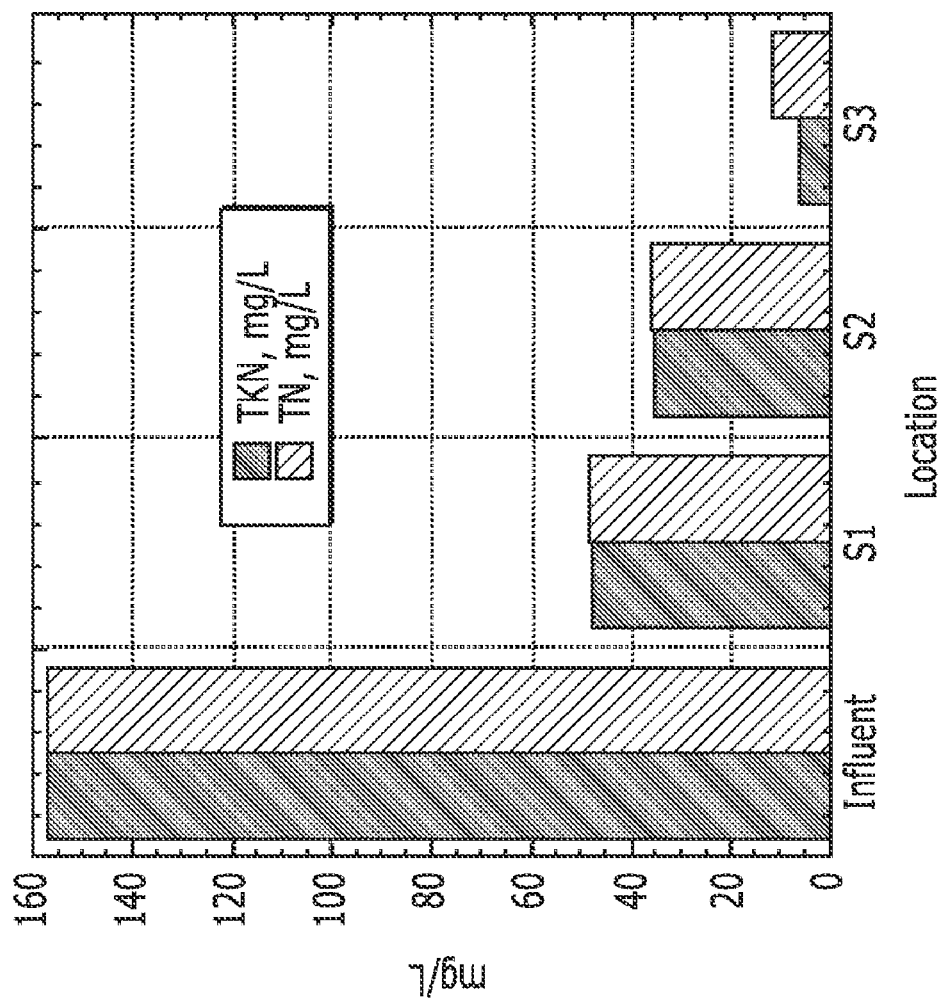
FIG. 8 graphs TKN and TN, in mg/L, for parallel flow nitrification and denitrification from a single influent dose. (S1 represents the first sump $32a''$, etc.)

Two single-pass experiments were conducted, the first experiment observing treatment of large slug of influent dosed equally to the first three cells; the second, observing treatment of a slug of water from one cell as it passed in serial batch mode through the system 10". In the first experiment, cells 12a'-12c' were drained and dosed in parallel with approximately 1275 L of water containing 700 grams of dried whey and 200 grams of 98% urea. Influent was sampled prior to dosing. After dosing, the drainage sumps 32a'-32e' of the respective cells 12a'-12c' were sampled and analyzed for TKN, nitrate, and nitrite. The water level in each sump was measured to confirm that the dosage split was approximately equal. Volumes of cells 12b' and 12c' were equal. The final volume of cell 12a' was 12% greater than cell 12b' or 12c'. Each step-fed cell removed a substantial fraction of total nitrogen (FIG. 8). All cells exhibited apparent simultaneous nitrification and denitrification.

Despite the substantially equal three-way split of the dose, there was a sharp difference in both nitrification and denitrification among the three cells 12a'-12c'. The reason for the difference is not known.

Figure 9:
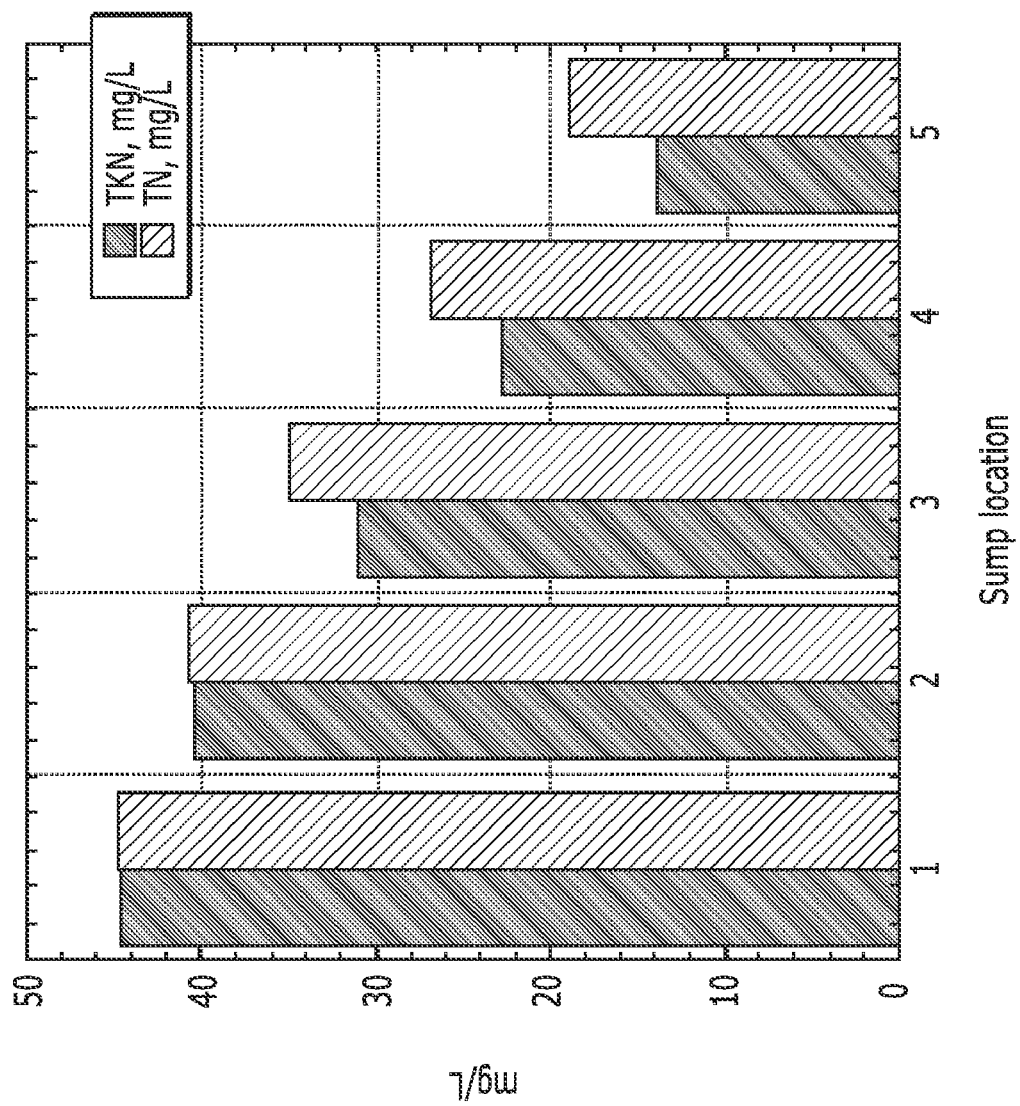
FIG. 9 graphs TKN and TN, in mg/L, for sequential nitrification and denitrification performance.

In the second experiment cells 12b'-12d' were drained. The volume in cell 12a' was retained. Then cell 12e' was recycled to cell 12a', as occurs in normal operation. The drainage sump of cell 12a' was sampled again. The volume of cell 12a' then was pumped successively from cell to cell. After each cell was flooded, a sample was drawn from each sump and analyzed as in the first experiment (FIG. 9). Apparent simultaneous nitrification and denitrification occurred in each cell. Average total nitrogen removal per cell was approximately 19%, as determined by the difference in TN between each sump after the serial drain and fill cycle was completed. Average hydraulic retention time of water exiting the discharge outlet is generally in a range of 12-36 hours. This periodicity is configurable with the control system depending upon the composition and strength of the incoming wastewater.

Figure 10:
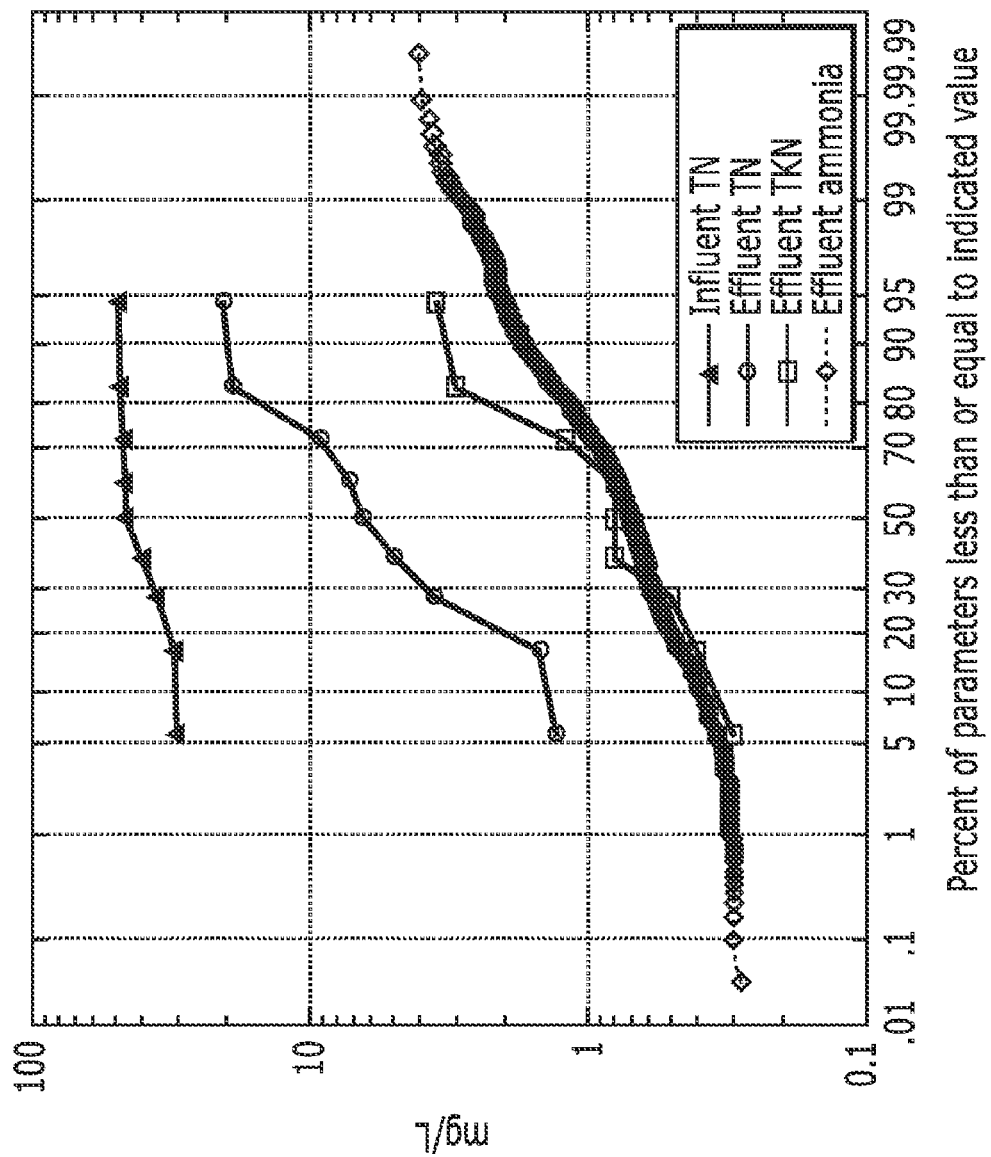
FIG. 10 graphs a comparison of nitrogen treatment frequency distribution between standard method analyses (TN, TKN) with multi-probe analysis ($NH_4^+$) with a sample size for $NH_4^+$ of n=1484.

Multi-probe data are consistent with standard method analyses (Table 8, FIG. 10). The effects of recycle can be seen in the shallow gradient of ammonia ($NH_4^+$) and turbidity (ntu) values. The effects of step feed can be seen in the readings from sump 32c', the final and third cell that receives step feed. DO oxygen and ORP readings are lowest in sump 32c ", which also has the highest $BOD_5$ values (Table 7). The low turbidity values for sump 32e' are consistent with that sump's low $BOD_5$ and TSS (Table 7).

TABLE 8

Summary of Multi-Probe Samples

| Location & statistic | | DO, mg/L | ORP, mV | pH | $NH_4^+$, mg/L | ntu |
|---|---|---|---|---|---|---|
| Sump 32a' | mean | 0.6 | 207 | 8.6 | 2.7 | 9.3 |
| | n | 914 | 914 | 914 | 914 | 907 |
| | Stdev | 0.6 | 182 | 0.6 | 2.5 | 7.1 |

TABLE 8-continued

Summary of Multi-Probe Samples

| Location & statistic | | DO, mg/L | ORP, mV | pH | $NH_4^+$, mg/L | ntu |
|---|---|---|---|---|---|---|
| | Max | 3.3 | 469 | 10.3 | 10.1 | 53.1 |
| | Min | 0.0 | −199 | 7.8 | 0.3 | 2.8 |
| Sump 32b' | mean | 0.8 | 208 | 8.4 | 2.1 | 12.9 |
| | n | 512 | 512 | 512 | 512 | 508 |
| | Stdev | 0.8 | 212 | 0.7 | 2.2 | 12.6 |
| | Max | 3.2 | 425 | 10.3 | 8.4 | 143.8 |
| | Min | 0.0 | −230 | 7.6 | 0.4 | 3.2 |
| Sump 33c' | mean | 0.4 | 149 | 8.6 | 2.6 | 12.0 |
| | n | 464 | 464 | 464 | 464 | 450 |
| | Stdev | 0.5 | 183 | 0.7 | 1.8 | 8.7 |
| | Max | 3.4 | 502 | 10.6 | 8.5 | 57.0 |
| | Min | 0.0 | −215 | 7.3 | 0.4 | 3.2 |
| Sump 32d' | mean | 1.2 | 465 | 7.8 | 2.1 | 7.9 |
| | n | 666 | 666 | 666 | 666 | 651 |
| | Stdev | 0.6 | 140 | 0.3 | 1.5 | 2.9 |
| | Max | 3.6 | 594 | 8.6 | 7.6 | 25.4 |
| | Min | 0.0 | −131 | 6.8 | 0.5 | 4.0 |
| Sump 32e' | mean | 1.2 | 479 | 7.9 | 0.9 | 5.6 |
| | n | 1488 | 1488 | 1488 | 1488 | 1484 |
| | Stdev | 0.9 | 70 | 0.3 | 0.6 | 2.6 |
| | Max | 4.2 | 589 | 8.4 | 4.1 | 51.2 |
| | Min | 0.1 | 334 | 7.3 | 0.3 | 3.3 |

Multi-probe effluent ammonia concentration values parallel standard methods analysis of effluent TKN (FIG. 10). Influent TKN concentrations are known for all sample days. Mean nitrification is >99% as calculated from mean influent TKN and effluent $NH_4^+$ probe values.

Figure 11:
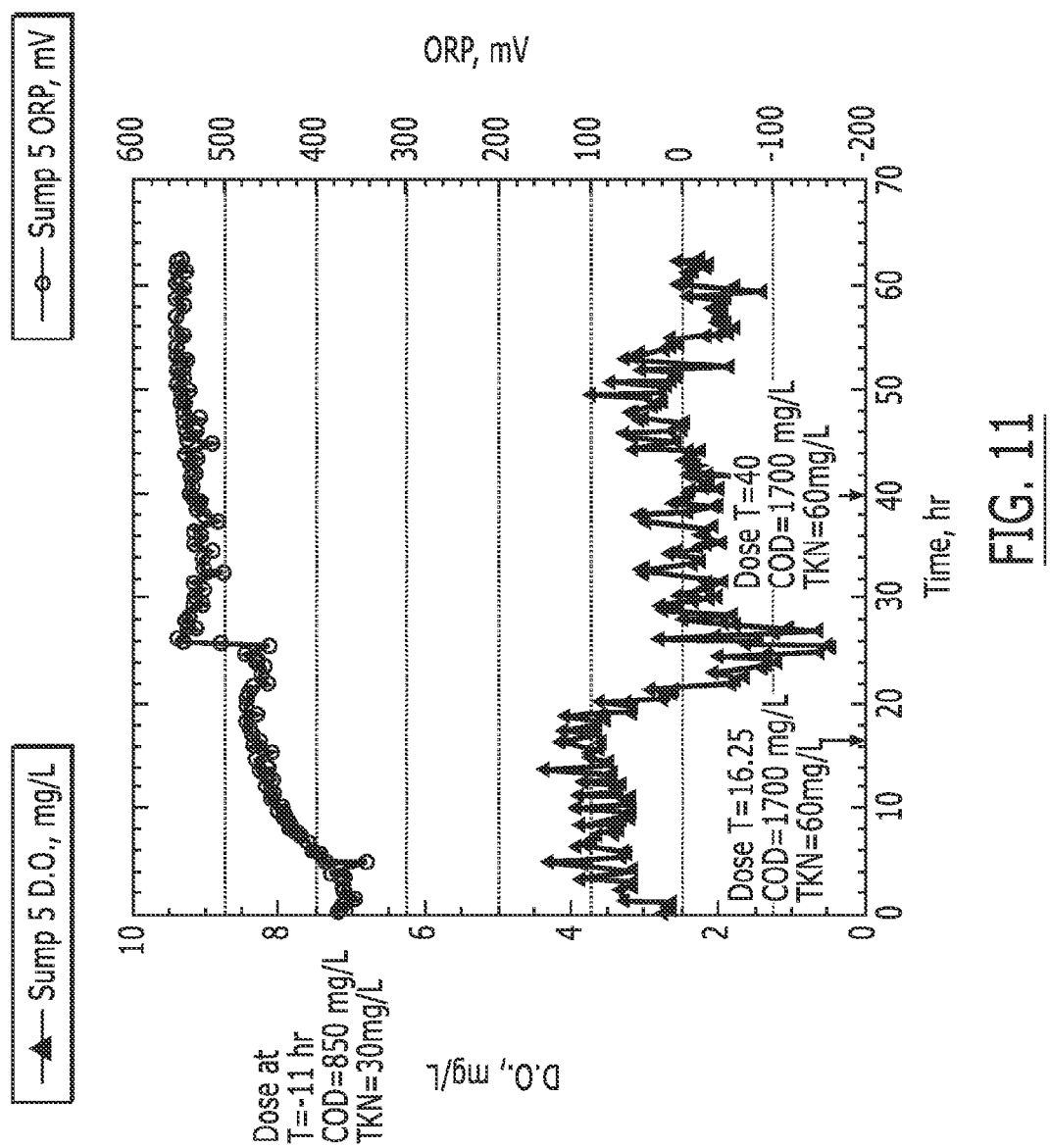
FIG. 11 graphs DO and ORP changes with time, illustrating a simultaneous depression of DO and increase of ORP for the final sump.
Figure 12:
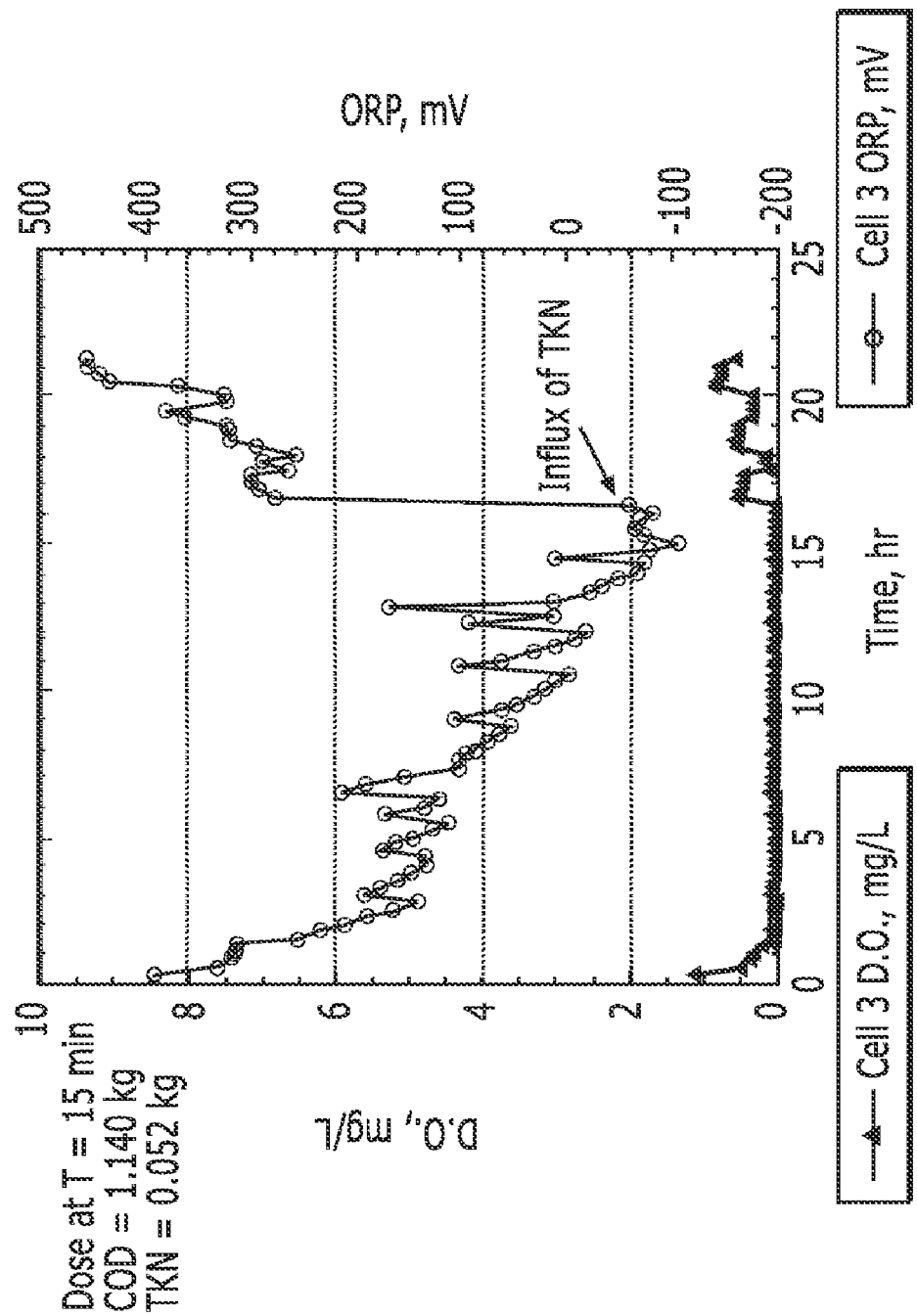
FIG. 12 graphs DO and ORP versus time for the third cell's sump, illustrating the cycling of ORP from nitrate flux during flood and drain cycles, with DO substantially constant.
Figure 13:
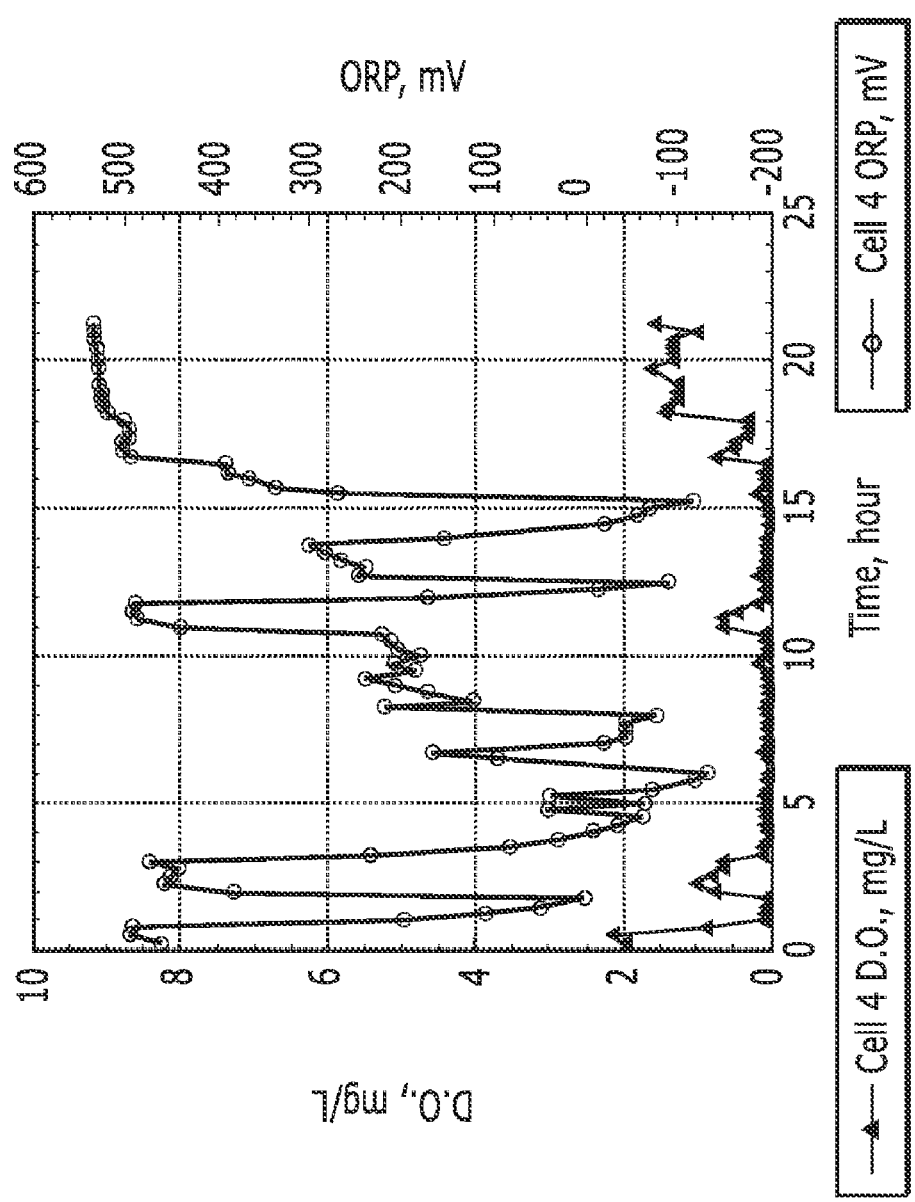
FIG. 13 graphs DO and ORP versus time, illustrating concurrent high ORP and DO values in the fourth cell's drainage sump over a 22.5-h period.

ORP probe analysis reveals indirect evidence of nitrification and denitrification. DO concentrations and ORP are partially decoupled in the TVF marsh system 10". Desorption of nitrate ions into bulk water in the flooded state can be seen in the cycling of ORP values, while DO changes little from data collected on separate days under the same dosing protocol (FIGS. 11-13). In FIG. 11 it may be seen that the effect of the doses on the final marsh cell 12e" lags until the flood and drain cycles carry the mass load forward. In FIG. 12, the influx of TKN is from activation of the irrigation timer feeding the dosing sump. In FIG. 13, note the cyclic peaking of ORP associated with drain and fill cycles, independent of DO. DO is not consumed by nitrification because nitrification takes place in biofilms exposed to the atmosphere. Nitrification therefore positively influences ORP. Although a significant mass of oxygen is transferred to bulk water by atmospheric diffusion during drain and fill cycles, the ORP and $BOD_5$ analyses provide strong evidence that nitrate drives a substantial part of the oxidation of organic carbon.

Analysis of exhaust gas from the marsh cells provides additional insight into denitrification within the TVFM marsh pilot (Table 8). Marsh cells receiving the most heavy organic carbon loading were observed to bubble, sometimes vigorously, uniformly across the bed for periods of up to a half-hour.

Evidence for denitrification can be found in samples in the increase of atmospheric nitrogen ($N_2$) mol fraction and nitric oxide (NO) ppm concentration (Table 9), both gases being end products of denitrification. Nitric oxide may also be produced in nitrification. Sample 1 was taken having air in the drain pipe. Sample 2, purged of air trapped in the drainpipe, exhibits advanced denitrification, as evidenced in the high nitrogen and low oxygen mole fractions. The percent difference between the NO concentrations in the samples and the reference atmosphere is semi-quantitative. Nitric oxide is highly reactive gas without a stable mol fraction in the atmosphere, making impossible a precise percent difference calculation between the reference atmosphere and the gas sample.

TABLE 9

Marsh Sump Exhaust Gas Analysis

| Analytical method | Gas | Reference atmosphere | Sample 1 | Sample 2 | Unit | Sample 1 ∂ atm, % | Sample 2 ∂ atm, % |
|---|---|---|---|---|---|---|---|
| Fixed gas analysis | $O_2$ | 20.9 | 19.4 | 5.2 | mol % | −7.4 | −75.3 |
| | $N_2$ | 78.1 | 79.6 | 90.4 | mol % | 1.9 | 15.8 |
| | $H_2$ | 0.00050 | <0.10 | <0.10 | mol % | | |
| | CO | trace | <0.01 | <0.01 | mol % | | |
| | $CO_2$ | 0.00330 | 0.39 | 3.67 | mol % | 11,700 | 111,100 |
| | $CH_4$ | 0.00007 | 0.62 | 0.72 | mol % | 947,000 | 1,100,000 |
| ASTM D-5504 | $H_2S$ | trace | <1 | <1 | ppm v/v | | |
| GC-chemiluminescence | NO | low ppb | 4 | 4 | ppm v/v | ~100,000 | ~100,000 |
| | $N_2O$ | 0.5 | <1 | <1 | ppm v/v | | |

The gas samples also reveal methane production and denitrification in the presence of oxygen. The analytical method used for hydrogen sulfide ($H_2S$) was insensitive for concentrations less than 1 ppm.

The bacterial community was characterized by fluorescent in situ hybridization (FISH; Table 10). Approximately 70% of all bacteria in the treatment system were characterized by FISH analysis to division in two rounds of testing. The composition of the bacterial community in the TVF pilot appears to be similar to activated sludge systems. Given the physiological (functional) diversity even within a genus, the bacterial community in the TVF pilot is probably not yet well characterized.

TABLE 10

Quantitative FISH Analysis of TVF Bacteria Community Structure

| Analyzed target | % | Analyzed target organisms | % | Features |
|---|---|---|---|---|
| Alpha-subclass of Proteobacteria | 11% | *Paracoccus denitrificans* | 9.0% | Aerobic denitrifier, heterotrophic nitrifier |
| | | *Hyphomicrobium vulgare* | <1% | Facultative denitrifier |
| | | *Nitrobacter* | <0.1% | Nitrite oxidizer |
| | | Other Alpha-*Proteobacteria* | 2.0% | |
| Beta-subclass of Proteobacteria | 28% | *Nitrosospira* (*Nitosospira tenuis*-lineage) | 5.0% | Ammonia oxidizer |
| | | *Nitrosomonas marina*-lineage | 3.0% | Ammonia oxidizer |
| | | *Nitrosomonas oligotropha*-lineage | 2.0% | Ammonia oxidizer |
| | | *Nitrosomonas communis*-lineage | <1% | Ammonia oxidizer |
| | | *Nitrosomonas cryotolerans*-lineage | <0.1% | Ammonia oxidizer |
| | | *Nitrosomonas eutropha, N. europea* | <1% | Ammonia oxidizer |
| | | *Nitrosococcus mobilis* | 1.0% | Ammonia oxidizer |
| | | *Alcaligenes faecalis* | <0.1% | Denitrifier |
| | | *Alcaligenes latus* and related bacteria | 2.0% | Facultative denitrifier |
| | | *Brachymonas denitrificans* and related bacteria | <0.1% | Facultative denitrifier |
| | | *Zooglea ramigera* and related bacteria | 8.0% | Facultative denitrifier |
| | | *Azoarcus/Thauera* group | 7.0% | Facultative denitrifier |
| | | Other Beta-Proteobacteria | <0.1% | |
| Gamma-subclass of Proteobacteria | 12% | *Pseudomonas* species | 4.0% | Most true *Pseudomonadacae*. denitrifiers |
| | | Other Gamma-Proteobacteria | 8.0% | |
| Group of Green Non-Sulfur Bacteria | 2% | Group of Green Non-Sulfur Bacteria | 2.0% | Filamentous. Diverse ecology and physiology |
| Group of Planctomycetes | 13% | *Anammox* bacteria | <1% | Autotrophic denitrifiers |
| | | Other Planctomycetes | 13.0% | Diverse ecology and physiology |
| Nitrospira | 4% | *Nitrospira* | 4% | Nitrite oxidizer |
| Holophagal/Acidobacteria | 0.0% | Holophagal/Acidobacteria | <0.1% | |
| Other bacteria | 30% | Other bacteria | 30% | |

When the bacterial community is categorized by function, approximately 41% of known species, genera, or groups in the TVF system 10″ are part of nitrogen mass transfer.

It should be noted that FISH probes exist for known bacteria only. Even so, many known bacteria do not yet have FISH probes available. Thus FISH analysis may miss species (or higher taxonomic classifications) vital to ecosystem function.

The TVF system 10″ is able to process a substantially higher $BOD_5$ mass loading than vegetated submerged beds (VSB). The mean mass loadings of 81 grams $BOD_5/m^2/d$ (720 lbs $BOD_5$/acre/d) is approximately 13 times higher than recommended by the EPA for VSB systems.

The high loading rate of this invention did not cause the system 10″ to clog, but did result in measurable headloss. Thermodynamically, a tidal flow wetland should be able to treat much higher mass loading than a VSB because of the repeated exposure of biofilms to atmospheric oxygen (~275 mg $O_2$/L). When exposed to the atmosphere endogenous respiration in biofilms is rate limited by substrate, not oxygen.

Total nitrogen removal in the TVF marsh pilot is sensitive to the rate of tidal cycles. Sensitivity results from denitrification, not nitrification (FIG. 10). Nitrification is less sensitive to tidal cycling rate than is denitrification. Removal of TSS was not comprehensively assessed.

Energy efficiency is a key feature of the TVF marsh system 10″, which relies substantially on tidal nitration to drive consumption of organic carbon in wastewater. The TVF marsh design also transfers oxygen directly into bulk wastewater by semi-passive atmospheric diffusion across water surfaces.

The effect of tidal nitration on the composition and physiological ecology of the bacteria community is of great interest. It is tentatively concluded that the bacterial community is similar to that of activated sludge. This is not surprising, as the initiation of the process of the present invention includes dosing with nitrifying activated sludge. Yet nitrification and denitrification within the marsh cell reactors does not behave like activated sludge, even for nitrifying and denitrifying reactors in series in a modified Ludzack-Ettinger process.

Nitrification, Nitration, and Denitrification

The system 10 of the present invention relies substantially on nitrate to drive consumption of organic carbon in wastewater, as measured by BOD or chemical oxygen demand (COD). Nitrification and denitrification in tidal vertical-flow marshes 12 are governed by adsorption chemistry. In this process, $NH_4^+$ ions in bulk water adsorb to negatively charged biofilms within the marsh media 27. Atmospheric oxygen is drawn down into marsh bed pore spaces when the marsh cell drains, causing rapid aeration of biofilms and subsequent nitrification (conversion of $NH_4^+$ to $NO_3^-$) of adsorbed $NH_4^+$ ions. Nitrification is inhibited by high BOD concentrations in bulk water, but recycle and step feed distribution of influent reduces BOD concentrations in receiving lagoons or marsh cells to low values (Table 2). There is no inhibition of nitrification by BOD in drained cells, where nitrification has been observed to be a high-rate process.

Semipassive aeration of lagoons and recycle ensures that effluent from the lagoons flowing into the marsh cells has a system-wide, positive effect on dissolved oxygen. Tidal fill and drain aerates marsh media biofilms. The combination of receiving recycle with positive dissolved oxygen and frequent aeration of media biofilms causes nitrifying bacteria to thrive within the marsh cells. The vast surface area of the marsh media biofilms ensures sufficient nitrification to meet stringent ammonia effluent discharge standards. Ammonia effluent values are consistently observed to be substantially less than 1.0 mg/L in the pilot system of the present invention.

Lagoons also reduce BOD and TSS loading of marsh cells 12, which help maintain design hydraulic conductivity of marsh cells 12 by reducing mass loading. Maintaining design hydraulic conductivity positively affects nitrification performance of the marsh cells 12.

The present system 10 is designed to transfer oxygen directly into bulk wastewater primarily by passive atmospheric diffusion across open water surfaces in marsh cells 12 and lagoons 11, thereby obviating the need for mechanical aeration of water, which is virtually ubiquitous in prior known wastewater treatment systems, since oxygen transfer efficiency is greatly limited by the low solubility of oxygen in water. Clean, cold freshwater saturates at 10-12 mg/L $O_2$; saturation of $O_2$ in wastewater is less. The oxygen transfer efficiency of mechanical aeration processes in wastewater is typically on the order of 4-16%, depending upon a variety of factors.

Frequent turnover of marsh and lagoon water columns is ensured by the mixing energy inherent in tidal flow pumping. This mixing energy may optimized by directing flow entering a lagoon from the upstream marsh cell toward the lagoon surface. Stratification of the marsh or lagoon water column is substantially prevented by this turnover. Frequent turnover of the water column enhances aeration by diffusion at the atmosphere-water interface, assisting to consume remaining BOD in the wastewater.

Oxygen for nitrification is provided during the postdraining period when air is in contact with biofilms in the marsh cell beds. Ammonia ions absorbed in biofilms nitrify when in contact with atmospheric oxygen as a consequence of bacterial metabolism. Desorption of nitrate during the fill phase provides significant quantities of nitrate to drive bacterial metabolism of labile carbon in the bulk liquid. It should be noted that many bacteria use nitrate as a terminal electron acceptor even in the presence of high dissolved oxygen concentrations.

Nitrate that has been created from ammonium ions in biofilms desorbs into bulk water in each subsequent flooding cycle, since, in contrast to oxygen, nitrate is highly soluble in water. Organic nitrogen and ammonia (TKN) is typically present in wastewater in concentrations of 20-85 mg/L, which is several times that of the saturation value of oxygen in wastewater. Low-head pumps used in draining of marsh cells have mechanical transfer efficiencies on the order of 80%. Therefore, ammonia is converted to nitrate via a mechanical means that is several times more efficient than mechanical transfer of oxygen to bulk wastewater. Nitrate per kilogram has the same oxidizing capacity of 2.86 kg of oxygen. Therefore, overall the energy efficiency for BOD (or COD) destruction of the nitration process is substantially greater than for aeration.

Lagoons, if present, may be aerated by mechanical means or aerated semipassively by atmospheric diffusion. In the latter, turnover of the lagoon water column occurs during flood and drain cycles. Mechanical aeration of lagoons is used as an ancillary process principally to prevent transient low dissolved oxygen conditions that would kill protozoa and invertebrates that consume bacterial biomass, but also to avoid nuisance conditions, such as periodic aeration to drown mosquito larvae.

Nitration and semipassive aeration permit the system 10 of the present invention to have a footprint that is substantially smaller than prior art systems because of the positive effect nitration and semipassive aeration have on process kinetics. The combined lagoon (or sump) and marsh cell footprints are one-quarter to one-half the size of conventional wetland wastewater treatment systems receiving the same flows, consume significantly less energy than aerated lagoons, and provide a level of treatment unattainable by lagoon treatment systems or conventional wetlands alone or in combination.

Oxygen demand for bulk water can be determined for activated sludge processes as follows:

$$\text{mg/L } O_2 \text{ demand} = (COD_{influent} - COD_{effluent}) + 4.6(NO_3)_f - 2.86(NO_3)_u \quad (2a)$$

where COD is in mg/L, $(NO_3)_f$ is the nitrate formed in mg/L, and $(NO_3)_u$ is the amount of nitrate utilized in mg/L. The nitrification oxygen demand term, $4.6(NO_3)_f$, drops out in a marsh cell process, because nitrate is formed in drained marsh cells, giving the oxygen demand for bulk water in the marsh cells as follows:

$$\text{mg/L } O_2 \text{ demand} = (COD_{influent} - COD_{effluent}) - 2.86(NO_3)_u \quad (2b)$$

Thus in Eq. (2b) a significant fraction of COD is consumed by nitrate, formed when marsh cells drain and desorbed into bulk water when marsh cells are flooded. The difference in oxygen demand between activated sludge and the present system 10 for the same wastewater flow and influent parameters is significant (Table 11). The nitration process reduces bulk-water oxygen demand by 41%. The actual percent reduction is sensitive to the influent COD: TKN ratio.

TABLE 11

Comparison of Bulk-water Oxygen Demand

| System | Influent COD, mg/L | Influent COD, mg/L | Influent TKN, mg/L | % conversion of TKN to nitrate | Nitrate formed, mg/L | Effluent nitrate, mg/L | Oxygen demand, mg/L |
|---|---|---|---|---|---|---|---|
| Activated sludge (with nitrification and denitrification) | 400 | 10 | 45 | 95% | 42.75 | 5.0 | 479 |

TABLE 11-continued

Comparison of Bulk-water Oxygen Demand

| System | Influent COD, mg/L | Influent COD, mg/L | Influent TKN, mg/L | % conversion of TKN to nitrate | Nitrate formed, mg/L | Effluent nitrate, mg/L | Oxygen demand, mg/L |
|---|---|---|---|---|---|---|---|
| TVFM | 400 | 10 | 45 | 95% | 42.75 | 5.0 | 282 |
| Act. sludge | mg/L $O_2$ = (400 − 10) + 4.6(42.75) − 2.86(42.75 − 5.0) | | | | | | |
| TVFM | mg/L $O_2$ = (400 − 10) − 2.86(42.75 − 5.0) | | | | | | |

The pumping process required for nitration meets the bulk water oxygen demand. As marsh and lagoon cells flood and drain, cell volume undergoes repeated turnover throughout the day. Transfer of oxygen by diffusion from the atmosphere is facilitated by this turnover process. The equation for the oxygen transfer (OT) from the atmosphere across the surfaces of the present invention is:

$$OT = (K_d \times C_T \times 24 \text{ h/d} \times V \times 1000 \text{ L/m}^3 \times 10^{-3} \text{ g/mg})/\text{area} \quad (3)$$

where $K_d$ is the empirically derived oxygen transfer coefficient in $h^{-1}$, $C_T$ is the oxygen saturation value at a temperature T in mg/L, V is the bulk water volume in $m^3$, and the area is in $m^2$.

The transfer coefficient is empirically derived and is a function of the dissolved oxygen concentration, temperature, and turbulence of the bulk water. A value of $K_d = 0.10$ is used for water volumes with temperatures at 20° C. that are turned over throughout the day. Oxygen saturation in wastewater at 20° C. is approximately 9.00 mg/L. Values from a pilot study of volume=3.2 $m^3$ and area=9.4 $m^2$ are used to complete a calculation of Eq. (3).

The equation for bulk water specific oxygen transfer for the present system is:

$$OT = (0.1/\text{h} \times 9.00 \text{ mg/L} \times 24 \text{ h/d} \times 3.2 \text{ m}^3 \times 1000 \text{ L/m}^3 \times 10^{-3} \text{ g/mg})/9.4 \text{ m}^2 = 7.59 \text{ g } O_2/\text{m}^2/\text{d} \quad (4)$$

Turnover of the bulk water volumes increases the effective transfer surface area on a daily basis. Daily flood and drain cycles increase the effective oxygen transfer area by a factor proportional to recycle flow, taken here for simplicity to be eight. Free water surfaces during the flooded stage are important to oxygen transfer. Without a free water surface, the effective surface area for oxygen transfer must be reduced by a factor proportional to media porosity.

An increase in the effective surface area by free water surfaces combined with flood and drain cycles increases the daily oxygen transfer to the marsh system as follows:

$$8 \times 9.4 \text{ m}^2 \times 7.5 \text{ g } O_2/\text{m}^2/\text{d} = 540 \text{ g } O_2/\text{d} \quad (5)$$

It must then be determined whether 540 g $O_2$/d is sufficient oxygen transfer to meet the required oxygen demand of bulk water in the system, for example, in the second embodiment 10". The daily oxygen mass requirement of bulk water in the system 10" is:

$$[400 \text{ mg/L } COD - 2.86(42.7 \text{ mg/L } NO_3)] \times 1.89 \text{ m}^3/\text{d} \times 1000 \text{ L/m}^3 \times \text{g}/1000 \text{ mg} = 525 \text{ g } O_2/\text{d} \quad (6a)$$

That for the TVF system 10" is:

$$282 \text{ mg/L} \times 1.7 \text{ m}^3/\text{d} \times 1000 \text{ L/m}^3 \times \text{g}/1000 \text{ mg} = 479 \text{ g } O_2/\text{d} \quad (6b)$$

Equations (5-6b) are essentially in agreement with observation of the systems 10',10", which consistently discharge fully treated water (BOD≦5 mg/L, TSS≦5 mg/L, total nitrogen≦3 mg/L) with a positive DO concentration. Both empirical observation and simple modeling confirm that tidal drain and fill cycles sufficient for nitration also promote sufficient transfer of atmospheric oxygen across free water surfaces to satisfy oxygen demand unmet by nitrate.

Denitrification (conversion of $NO_3^-$ to $N_2$) occurs when bacteria use nitrate as a terminal electron acceptor to metabolize organic carbon, typically induced by anoxic or anaerobic conditions. Desorption of nitrate into bulk water when marsh cells are flooded has been observed to induce high-rate denitrification regardless of DO concentration. The term tidal nitration denotes the transfer of nitrate to bulk water by the ammonia sorption/nitrate desorption process in flood and drain cycles.

FISH analysis and a review of the physiological characteristics of known bacteria provides insight into biological foundations of denitrification in the pilot.

Nine percent of all pilot bacteria, identified as *Paracoccus denitrificans*, were characterized by quantitative FISH analysis as aerobic denitrifiers/heterotrophic nitrifiers, partially explaining total nitrogen removal.

Facultative denitrifiers, in contrast, are classically described as requiring a delay period of 4 to 8 hours to mobilize nitrate reductase. Facultative denitrifiers, by definition, use either oxygen or nitrate as a terminal electron acceptor, but not both at the same time. Bioenergetic considerations favor facultative over constitutive denitrification because producing one set of enzymes, rather than two at the same time, is a substantially smaller metabolic cost. On the other hand, ecological conditions can tilt the advantage to constitutive denitrifiers. Constitutive (aerobic) denitrifiers will have an ecological advantage over facultative denitrifiers in environments subject to frequent, sudden, alternating onset of anaerobic and aerobic conditions. Tidal flow produces exactly those ecological conditions. The range and frequency of oxygen concentrations and ORP values that biofilms are subjected to in tidal flow systems cannot be produced in either activated sludge or conventional wetland treatment systems.

Conditions favoring constitutive denitrifiers do not necessarily exclude facultative denitrifiers. FISH probes from this study unequivocally demonstrate that both constitutive and facultative denitrifiers thrive in the same volume. Facultative denitrifiers differ widely in their tolerance to oxygen concentrations before production of nitrate reductase is suppressed. Some of the facultative denitrifiers identified by FISH probes in this study have substantial tolerance to the presence of oxygen: *Zooglea ramigera*, *Pseudomonas* sp., and *Alcaligenes* sp. Their denitrification activity is unlikely to be significantly suppressed by periodic exposure to high oxygen concentrations.

The complex environment of a tidal marsh system may complicate enzyme mobilization for facultative denitrifiers. Experiments done to determine rates of enzyme mobilization in wastewater treatment systems are conducted in well-mixed reactors. Media in a tidal marsh system is not well mixed. It has been reported that, in contrast to pure liquid cultures, there is no clear-cut relationship between membrane bound nitrate reductase (NAR, responsible for the first step of the denitrification process) synthesis and enzyme activity in complex environments. Synthesis of NAR in sterile soil microcosms has been reported to occur after one day in both aerobic and anaerobic environments. The media of a tidal marsh system is much like soil. It may be, therefore, that a community of facultative denitrifiers in a tidal marsh could have a heterogeneous expression of NAR, causing them to behave in aggregate as aerobic denitrifiers—some expressing NAR, others not—but without a heterotrophic nitrification capacity.

Internal treatment mechanisms of constructed wetlands are poorly characterized, if at all, by "black box" input-output analyses. Additional research is needed to better understand how characterization of the bacterial community in a tidal marsh system can provide insights into process engineering, but the insights garnered thus far by genetic probes are valuable when considered in light of other data. Once the underlying biology of treatment wetlands is decrypted, more powerful and reliable quantitative design tools can be developed.

A means of controlling this process is to use ORP probes to control draining of selected marsh cells 12. A PLC or SCADA controller attached to an in situ ORP probe may be used to control drainage of marsh cells 12. Selected cells, those receiving step feed influent, may have drainage delayed to allow anoxic conditions to develop, thereby denitrifying nitrate-rich recycle flow. The ORP probe provides information to the operator and/or PLC to drain the marsh cell before reducing conditions become strong enough to significantly stress marsh plants. In addition, regardless of ORP readings, preferably marsh cells 12 used for denitrification should be drained periodically to promote digestion of biofilms and other biomass within the cells. Alternatively, the process recycle rate can be set to flows that induce anoxic conditions within flooded marsh cells 12.

In a preferred embodiment the control system should be operative to achieve a periodicity of the flooding and draining steps that is substantially less than an enzyme mobilization time required for facultative denitrifiers in the biofilms to convert substantially wholly to using one of oxygen and nitrate as a terminal electron acceptor for heterotrophic respiration. Further, a periodicity of the flooding and draining steps should be sufficiently rapid to create conditions in the biofilms favorable to a growth of a substantial population of constitutive denitrifiers, the denitrifiers being adapted to substantially simultaneously produce enzymes for using both oxygen and nitrate as terminal electron acceptors for heterotrophic respiration.

Apparent simultaneous nitrification and denitrification within marsh beds substantially accounts for denitrification. Undetectable concentrations of nitrate and nitrite (<0.05 mg/L) have been frequently observed in marsh drainage sumps across the entire pilot treatment system.

Biochemical Oxygen Demand

Biochemical oxygen demand is removed from wastewater in the present system mostly through anoxic and aerobic processes, taking advantage of the types of heterotrophic bacteria formed. Heterotrophic biomass within the marsh cells comprises mostly biofilms attached to media, plant roots, and plant thatch. Within the lagoons 11, heterotrophic biomass comprises mostly bacterioplankton comprising mostly single-cell bacteria with a size range of approximately 0.1-10 µm. Limited flocculation of bacterioplankton occurs, but without a clarifier to enrich floc-forming heterotrophs, flocs do not dominate bacterial biomass within the lagoons.

A significant fraction of labile wastewater nutrients can be converted into bacterioplankton in lagoons. Horizontal dispersion occurs through the media, plant roots, and plant thatch. Biofilms develop on the marsh media, plant roots, and plant thatch surfaces. Marsh cells and lagoons have differing microbial ecologies; marsh cell ecology is substantially based on biofilm communities; lagoon ecology is substantially based on suspended bacterioplankton communities. (The ecology base refers to the lowest trophic level.) Each is an ecotype.

Distribution of bacterial biomass into different ecotypes reduces bacterial yield by exposing it to a broad array of grazing organisms. Bacterioplankton are the food source for a diverse array of organisms in the lagoons and within the marsh cells. Bacterioplankton are converted into carbon dioxide by respiration of organisms that consume them and are incorporated into the biomass of the consumer organisms. Biofilms are similarly transformed into carbon dioxide and consumer biomass by a different set of grazing organisms.

The lagoon cells 11 reduce the concentration of BOD reaching the marsh cells 12. By doing so, marsh cells 12 produce less bacterial biomass, helping to preserve design hydraulic conductivity of the marsh media 27, which in turn maintains design treatment performance of marsh cells 12.

Suspended Solids, Yield, and Biofilms

Yield of bacterial biomass grown from influent nutrients is defined as mass units of bacteria produced from mass units of influent BOD and total nitrogen. Suspended solids, yield, and biofilms are all related in the present systems 10,10',10". Mechanisms of in situ digestion of VSS and biofilms are key elements of the present systems 10,10',10", which reduces yield to a fraction that is effectively zero on an annual operating basis.

Suspended Solids

TSS is a lumped parameter that measures the organic and inorganic particle mass in a water sample. VSS is the measure of the organic content of TSS. After degritting, a pretreatment process, TSS in wastewater is composed almost entirely of VSS. Most organic particles in domestic sewage or industrial food wastes are transformed into labile carbon by bacterial action. (There will likely always be a small recalcitrant particle fraction that is not readily transformed by bacteria.) Labile carbon is BOD and has the same fate as BOD described above.

The lagoon cells 11 reduce the concentration of TSS reaching the marsh cells 12 by the action of grazing organisms. Reduction of bacterial biomass loading, in turn, helps preserve design hydraulic conductivity of the marsh media. Preservation of hydraulic conductivity maintains design treatment performance of the marsh cells 12.

Volatile suspended solids entering the marsh cells are retained on marsh root mats 291 and media 27, where they are subjected to oxidation and endogenous respiration when exposed to the atmosphere. Retained VSS is also, and importantly, subject to consumption by grazing organisms; when submersed and saturated by aquatic invertebrates, and when dry by terrestrial invertebrates.

Inorganic and recalcitrant organic constituents of TSS are substantially filtered out by a sieve-type action of marsh media 27. Distribution of these constituents by step feed provides a large filtration area, thereby significantly retarding the tendency of the particles to fill interstitial media pore spaces. Eventually, over several years, inorganic and recalcitrant TSS are likely to accumulate on the surface of marsh media 27. Plants 29 growing through accumulated TSS will tend to preserve hydraulic conductivity for vertical flow. It is expected that recalcitrant organic compound will require removal by scraping and excavation approximately once every ten years.

Aeration by tidal flux in marsh cells 12 also provides a favorable environment for actinomycetes and fungi. Both groups are predominantly composed of obligate aerobes. Both groups excrete a wide range of enzymes that break down recalcitrant organic compounds. Populations of both groups have a high positive correlation with wetland plant roots. It is therefore probable that accumulation of recalcitrant organic particulates will be significantly retarded by design conditions that favor growth of actinomycetes and fungi.

The vertical flow path in the marsh beds 12 permits some particles to migrate downward into the bottom drain collection system 25. In each pass through the marsh bed, a significant percentage of particles are captured on biofilm surfaces or consumed by protozoa and invertebrate organisms, and are effectively by multiple passes and recycle through marsh 12 and lagoon 11 cells.

Without the tidal flow action that periodically drains vertical flow marshes, excessive VSS would accumulate in media interstices. Excessive accumulation of VSS, in the form retained biological and organic particles, would result in unacceptable headloss and, ultimately, clogging of marsh media 27.

Tidal flow exposes filtered VSS to the atmosphere, ensuring drainage to near field capacity and rapid aeration. At field capacity, water is held in thin films on media and root surfaces. In thin films, diffusion of oxygen from the atmosphere is rapid. Oxygen concentration in the atmosphere is on the order of 275 mg/L, whereas in wastewater it seldom exceeds 4 mg/L. Tidal drainage of the marsh cells therefore permits aerobic degradation of VSS that is not rate limited by oxygen concentrations. Aerobic degradation is a process of endogenous respiration within biofilms and consumption of biofilms by (obligate aerobic) microinvertebrate populations. Endogenous respiration is a process whereby nutrient-starved bacteria consume cellular carbon or extracellular exudates for respiration, releasing enzymes to induce lysis of nearby cells or extracellular exudates, thereby obtaining carbon for respiration. High-rate endogenous respiration is induced in situations where dissolved nutrients are scarce, but terminal electron acceptors are abundant. The result of this degradation process is a high rate of in situ VSS digestion by endogenous respiration that prevents excessive accumulation of organic and biological mass within the marsh media.

Yield and Biofilms

In the present systems 10,10',10" measurement of yield is not straightforward because biofilms on marsh media and plant roots are mostly composed of bacterial growth. Excess bacterial growth in the present systems 10,10',10" is manifested in clogging of media beds as biofilms grow to substantially fill media pore spaces. A net yield of effectively zero is manifested as long-term operation of the system without substantial loss of media hydraulic conductivity, achieved by draining of marsh cells and process recycle. Just as VSS retained in drained marsh beds is exposed to atmospheric oxygen, so are biofilms within the bed. The high dissolved oxygen concentrations within drained bed pore spaces induce endogenous respiration of biofilms concurrently with nitrification of adsorbed $NH_4^+$ ions.

Recycle of effluent also induces endogenous respiration of biofilms. The effluent BOD concentration is very low, typically less than 10 mg/L. When the volume of the final marsh cell/lagoon pair is recycled to the first cell/lagoon pair, or from a final marsh cell to a first marsh cell, nitrate in the first marsh cell desorbs into bulk water with very little labile carbon present. Labile carbon must then come from endogenous respiration or lysis of cells within biofilms, or hydrolysis of cellular exudates. As the slug of recycle volume proceeds throughout the system, this process is repeated in downstream marsh cells.

Draining of marsh cells and process recycle subject marsh bed biofilms and entrapped VSS to endogenous respiration conditions throughout most of any given 24-hour period. The high frequency of endogenous respiration state conditions permits a substantially higher rate of mass loading in the present systems 10,10',10" than is possible in conventional treatment wetlands.

Pathogen Removal

Pathogen removal in the present treatment systems 10,10', 10" relies significantly on size-specific biological particle consumption by protozoa and invertebrate grazing organisms. Most filter feeders consume whole particles suspended in open water environments, restricting filter feeders to particles small enough to fit in their mouth cavity, but large enough to yield more energy than is expended in consumption of the particles. Therefore, a community of different populations of filter-feeding organisms is required to remove a broad spectrum of particle size classes.

Conclusions

The energy efficiency of oxygen transfer in the present systems 10,10',10" is a significant improvement over prior art wastewater treatment systems, and is capable of meeting a total nitrogen effluent concentration of $\leq 10$ mg/L, that is, substantially complete nitrification and denitrification processes. A comparison of energy efficiency is necessarily approximate because of the inherent variation in wastewater treatment design, but even approximate comparisons are revealing.

The present systems 10,10',10" can provide advanced tertiary treatment at approximately one-quarter to one-third of the power requirements of activated sludge treatment systems.

The present systems 10,10',10" also provide much better treatment at approximately 10% of HRT and 50% of power requirements of an aerated lagoon example.

A known reciprocating wetland system (Behrends, U.S. Pat. No. 5,863,433) teaches an oxygen transfer that is inherently limited by subsurface flow. The lack of open water surfaces in lagoons and wetland cells reduces the surface across which air can diffuse by a factor determined by media porosity. This patent gives measured oxygen transfer rates of 0.53 to 2.12 g $O_2/m^2$/day. In contrast, in the present systems 10,10',10", calculated oxygen transfer rates of 7.5 g $O_2/m^2$/day (Eq. 4) fit stoichiometric requirements of observed treatment performance and effluent dissolved oxygen concentration. The difference between the two oxygen transfer rates is significant. Given an effective media porosity of 30% used by Behrends, a multiplication of his values by 3.33 to account for loss of surface area would bring his results to 1.76-7.05 g $O_2/m^2$/day. These values are close to observed transfer in the present systems 10,10',10", which has effectively three times the surface area for oxygen transfer as the Behrends system.

The lower areal oxygen transfer rate in the Behrends system therefore requires more pumping than for the present systems 10,10',10" if all other values are held equal. Behrends teaches most preferred limits for reciprocating cycles as 2.0-4.0 hours with a greater operating range of 0.10-24.0 hours. These reciprocating cycle rates are with a system HRT most preferably of 2.0-4.0 days within a greater operating HRT of 0.1-80 days. In contrast, with the present systems 10,10',10", within 2.0-4.0 hour flood and drain cycles, an HRT of approximately 1 day is needed to achieve advanced tertiary treatment from high-strength wastewater influent of $BOD_5$=300 mg/L and TKN=45 mg/L. Substantially higher wastewater influent strengths have been tested without significant variation in treatment performance.

A clear hierarchy of the importance of optimization of free water surface for oxygen transfer can be established (Table 7). The present systems 10,10',10" maximize free water surfaces, and hence atmospheric oxygen transfer to bulk water, and has the best observed treatment.

BOD Removal

Removal of BOD in lagoon 11 and marsh cells 12 occurs at a much higher rate than conventional treatment wetlands because of semipassive oxygen transfer mechanisms (nitration and aeration) described above, which eliminate in most cases the need to aerate the lagoon 11 component of the present system 10 to maintain a positive lagoon DO concentration that would otherwise be required in conventional aerobic lagoons in series. Step feed and recycling also reduces BOD loading, promoting positive dissolved oxygen levels that enhance BOD removal.

Nitrogen Removal

Nitrification takes place in the marsh beds 12 to produce effluent ammonia concentrations less than 1 mg/L, as discussed above. Oxygen transfer from the atmospheric and photosynthetic processes in lagoons 11 and flooded marsh cells 12 also assist nitrification in marsh media beds.

Tidal cycling can be manipulated to produce transient anoxic conditions in marsh beds that promote a high degree of denitrification. In particular, the passive forward flow mode is highly effective at denitrifying nitrified process recycle.

No other known conventional wetland treatment system provides the same level of treatment and operational flexibility in nitrification and denitrification processes.

Treatment Comparison

The treatment performance of the present treatment systems 10,10',10" represents a substantial improvement over the prior art in flood and drain (tidal) treatment wetlands. Removal of BOD or COD is substantially improved, the difference in treatment performance attributable in part to improved transfer of atmospheric oxygen across lagoon and marsh free water surfaces. Process recycle of effluent to the first marsh cells also appears to improve denitrification. Additionally, step feed distributes instantaneous mass loading to all cells, and recycle significantly raises DO concentration and OPR potential in marsh cells.

Energy Efficiency

The present systems 10,10',10" are at least twice as energy efficient as an activated sludge system providing advanced tertiary treatment and about twice as efficient as aerated lagoons systems providing secondary treatment. Energy efficiency appears to be substantially greater in part because of the greater oxygen transfer rates in the present systems 10,10',10".

The systems 10,10',10" and methods of the present invention are believed to form a significant improvement over existing wetland and lagoon wastewater treatment technology. No known system uses lagoons as a means to enhance wetland treatment performance, alternating lagoons and wetlands in series, vertical flow tidal wetlands with and without lagoons, or explicit ecological design principles to optimize any element of process or hydraulic design.

A variety of analyses have demonstrated that the TVF marsh system 10" is a treatment system capable of advanced simultaneous nitrification and denitrification. The basic biophysical mechanisms behind nitrification and denitrification have been demonstrated. The design implications of a FISH quantitative characterization of the pilot bacterial community have been tentatively explored. The tidal flow wetland treatment systems 10,10',10" of the present invention substantially outperform conventional wetland treatment systems on smaller treatment footprints. Moreover, the process of tidal nitration inherent to tidal flow treatment systems is substantially more energy efficient than activated sludge systems providing advanced biological nitrogen removal.

What is claimed is:

1. A wastewater treatment system comprising:
    a first, a second, and a third vertical flow marsh cell, each having an outlet adjacent a bottom thereof, each marsh cell adapted to contain particulate media and plants having roots extendible into the media, so that the roots and the media are positioned to contact water flowing into each marsh cell;
    means for transporting water to be treated to a surface of the first and the second marsh cell, from the first marsh cell outlet to the second marsh cell surface, from the second marsh cell outlet to a surface of the third marsh cell, and from the third marsh cell outlet to a discharge outlet; and
    means for substantially emptying each marsh cell on a predetermined cycle for a predetermined time, for permitting aeration of contents of each marsh cell.

2. The system recited in claim 1, wherein the first, the second, and the third marsh cell each comprises:
    a basin having a hole adjacent a bottom thereof, the hole comprising the marsh cell outlet;
    a drain collection trough positioned beneath the hole for collecting water exiting therefrom; and
    wherein the means for transporting water from the respective first, second, and third marsh cell outlet comprise respective first, second, and third sumps and first, second, and third pumps positioned within the respective first, second, and third sumps.

3. The system recited in claim 2, wherein each of the first, the second, and the third marsh cells is further adapted to contain a mat positionable above particulate media therein, the mat adapted for permitting plants to root therein.

4. The system recited in claim 3, wherein the mat comprises a pre-grown mat of wetland plants.

5. The system recited in claim 2, wherein the water transporting means further comprises piping for distributing water at a unitary point of the respective first, second, and third marsh cell surface.

6. The system recited in claim 2, wherein the first and the second marsh cell is each adapted to maintain at least one of a population of aquatic invertebrates and a population of detritivores.

7. The system recited in claim 1, wherein the means for transporting incoming water comprises means for transporting water substantially equally between the first and the second marsh cell.

8. The system recited in claim 1, wherein the predetermined cycle comprises a cycle in the range of 1 to 20 times per day.

9. The system recited in claim 1, further comprising means for diluting water entering at least the first marsh cell.

10. A wastewater treatment system comprising:
- a first, a second, a third, a fourth, and a fifth vertical flow marsh cell, each having an outlet adjacent a bottom thereof, each marsh cell adapted to contain particulate media and plants having roots extendible into the media, so that the roots and the media are positioned to contact water flowing into each marsh cell;
- means for transporting incoming water to be treated to a surface of the first, the second, and the third marsh cell, from the first marsh cell outlet to the second marsh cell surface, from the second marsh cell outlet to the third marsh cell surface, from the third marsh cell outlet to the fourth marsh cell surface, from the fourth marsh cell outlet to the fifth marsh cell surface, and from the fifth marsh cell outlet to a discharge outlet; and
- means for substantially emptying each marsh cell on a predetermined cycle for a predetermined time, for permitting aeration of contents of each marsh cell.

11. The system recited in claim 10, wherein the means for transporting incoming water comprises means for transporting water substantially equally among the first, the second, and the third marsh cell.

12. The system recited in claim 10, further comprising:
- a sixth vertical flow marsh cell having a surface, an outlet adjacent a bottom thereof, particulate media, and plants having roots extendible into the media, the roots and the media positioned to contact water flowing into the sixth marsh cell, the sixth marsh cell positioned downstream of the fourth marsh cell and upstream of the fifth marsh cell; and
- wherein the transporting means comprises means for transporting water from the fourth marsh cell outlet to the sixth marsh cell surface and from the sixth marsh cell outlet to the fifth marsh cell surface.

13. The system recited in claim 10, further comprising means for diluting water entering at least the first marsh cell.

14. A wastewater treatment system comprising:
- a first, a second, a third, a fourth, and a fifth vertical flow marsh cell, each having an outlet adjacent a bottom thereof, each marsh cell adapted to contain particulate media and plants having roots extendible into the media, so that the roots and the media are positioned to contact water flowing into each marsh cell;
- means for transporting incoming water to be treated to a surface of a plurality of the first through the fourth marsh cells, from the first marsh cell outlet to the second marsh cell surface, from the second marsh cell outlet to the third marsh cell surface, from the third marsh cell outlet to the fourth marsh cell surface, from the fourth marsh cell outlet to the fifth marsh cell surface, and from the fifth marsh cell outlet to a discharge outlet; and
- means for substantially emptying each marsh cell on a predetermined cycle for a predetermined time, for permitting aeration of contents of each marsh cell.

15. The system recited in claim 14, further comprising means for diluting water entering at least the first marsh cell.

* * * * *